US006919030B2

(12) United States Patent
Thorpe et al.

(10) Patent No.: US 6,919,030 B2
(45) Date of Patent: Jul. 19, 2005

(54) PROCESS FOR RECOVERING CYANIDE FROM COPPER-CONTAINING FEED MATERIAL

(75) Inventors: John A. Thorpe, Germantown, TN (US); Christopher A. Fleming, Omemee (CA)

(73) Assignee: Hannah Technologies Limited Partnership, Germantown, TN (US)

( * ) Notice: Subject to any disclaimer, the term of this patent is extended or adjusted under 35 U.S.C. 154(b) by 139 days.

(21) Appl. No.: 10/373,006

(22) Filed: Feb. 24, 2003

(65) Prior Publication Data

US 2003/0205533 A1 Nov. 6, 2003

Related U.S. Application Data

(63) Continuation-in-part of application No. 09/651,553, filed on Aug. 30, 2000, now abandoned.
(60) Provisional application No. 60/157,307, filed on Oct. 1, 1999.

(51) Int. Cl.[7] .............................. C02F 1/42; B01J 49/00
(52) U.S. Cl. ...................... 210/665; 210/670; 210/684; 210/688; 423/24
(58) Field of Search .................................. 210/665, 670, 210/684, 688; 423/24; 75/710, 711, 712

(56) References Cited

U.S. PATENT DOCUMENTS

| 4,708,804 A | * | 11/1987 | Coltrinari | .................... | 210/677 |
| 5,605,563 A | * | 2/1997 | Kidby et al. | .................. | 75/744 |
| 5,807,421 A | | 9/1998 | Fleming et al. | | |

OTHER PUBLICATIONS

Davis, M.R. et al., Proposed Solvent Extraction Route for the Treatment of Copper Cyanide Solutions Produced in Leaching of Gold Ores, National Symposium on Cost Effective Gold Recovery from Refractory Ores, Melbourne, Australia, Jul. 1998.

Goldblatt, E., Recovery of Cyanide from Waste Cyanide Solutions by Ion Exchange, Industrial and Engineering Chemistry, (1959), pp. 241–246, vol. 51:3.

* cited by examiner

Primary Examiner—Robert A. Hopkins
(74) Attorney, Agent, or Firm—Senniger Powers

(57) ABSTRACT

A process for recovering cyanide from feed material containing cyanide and copper involves the steps of: (a) contacting the feed material with a strong base anion exchange resin whereby copper and cyanide from the feed material are adsorbed onto the resin; (b) contacting the resulting resin with an eluant solution containing free cyanide ion to elute copper and cyanide from the resin; (c) separating the eluted resin from the eluting solution or eluate from step (b); (d) acidifying the eluate from step (b) to precipitate copper; (e) separating the acidified solution from the precipitate in step (d) and alkalizing directly or after concentration the separated solution containing HCN; (f) contacting the eluted resin from step (b) with an acid to condition the resin and remove additional cyanide while leaving most of the copper in the resin phase; (g) converting the HCN solution formed in step (f) to cyanide ion, directly or after concentration of the HCN solution, by the addition of alkali; and (h) returning the conditioned resin from step (f) to step (a) above.

21 Claims, 1 Drawing Sheet

PROCESS FOR RECOVERING CYANIDE FROM COPPER-CONTAINING FEED MATERIAL

CROSS-REFERENCE TO RELATED APPLICATIONS

This application is a continuation-in-part application of U.S. Ser. No. 09/651,553 filed Aug. 30, 2000, now abandoned, which claims the benefit of U.S. Provisional Application No. 60/157,307 filed Oct. 1, 1999.

BACKGROUND OF THE INVENTION

This invention relates to a process for recovering cyanide from feed material containing cyanide and copper and, more particularly, to such a process for recovering cyanide from solutions or pulps containing copper by ion exchange employing a cyanide eluant.

As is known, the recovery of gold from copper/gold ores containing high levels of cyanide-soluble copper has been difficult in conventional gold carbon-in-pulp (CIP) processes. Many common copper minerals are soluble in the dilute cyanide solutions typical of leach conditions found in gold cyanidation processes. During leaching, certain copper minerals react with free cyanide to form various cuprous cyanide species that compete with the aurocyanide species for available active sites on the carbon. In conventional CIP plants, high levels of free cyanide are maintained to favour the adsorption of $Au(CN)^-_2$ anion over the $Cu(CN)_3^{2-}$ and $Cu(CN)_4^{3-}$ anions (M. R. Davis et al., Proposed Solvent Extraction Route for the Treatment of Copper Cyanide Solutions Produced in Leaching of Gold Ores, Melbourne, Australia, RMIT University, July 1998, National Symposium on Cost Effective Gold Recovery from Refractory Ores).

Following gold adsorption, the free and complexed cyanide species are generally discarded to a tailings impoundment. Once in the tailings dam, ultra-violet light decomposes free cyanide, naturally detoxifying the tailings solution with time. As the free cyanide level in solution decreases, however, the $Cu(CN)_3^{2-}$ and $Cu(CN)_4^{3-}$ species also decompose, liberating additional cyanide. This equilibrium effectively buffers the free cyanide concentration in solution, and can result in significant environmental problems. In addition, trace levels of $Cu(CN)^-_2$ in the dam return water consume free cyanide when reintroduced to the cyanide leach circuit.

Detoxification is employed when cyanide-bearing tailings cannot be discarded directly into the tailings impoundment due to environmental or safety-related concerns. The high costs of cyanide destruction and excessive cyanide consumption when treating high cyanide soluble copper ores represent a significant portion of total operating costs, often preventing the development of such projects. This has prompted interest in alternative detoxification technologies that remove copper and recover cyanide for re-use in the leaching process.

Of the several technologies currently available, only one, the so-called Cyanisorb process (trademark of Coeur d' Alene Mines Corporation) has been commercialized to date. In the Cyanisorb process, reliance is on the simplest aspects of cyanide and metal cyanide chemistry and the process does not employ any ion exchange or adsorption technology. In general, the existing technologies are either too expensive to construct and operate, do not recover all of the complexed cyanide or produce a low-value copper by-product that cannot be marketed.

Goldblatt (Recovery of Cyanide from Waste Cyanide Solutions by Ion Exchange, Vol. 51, No. 3, March 1959, Industrial and Engineering Chemistry) teaches the use of ion exchange resins in the recovery of cyanide, water and complexed base materials from the effluent of gold works, but does not teach the recovery of copper. Fleming et al. [U.S. Pat. No. 5,807,421, dated Sep. 15, 1998], teaches a hydrometallurgical extraction process for treating copper feed materials which comprises the steps of:

(a) treating the feed materials with an aqueous cyanide solution having a molar ratio of CN:Cu of >3 thereby leaching copper and gold;

(b) optionally removing and recovering substantially all gold, if present, from the pregnant leach solution or pulp;

(c) contacting the resulting solution or pulp with an anion exchange resin thereby adsorbing copper cyanide at a CN:Cu ratio of <3:1 and gold cyanide, if present, onto the resin;

(d) separating the resin having copper cyanide and gold cyanide, if present, adsorbed thereon from the now depleted solution or pulp containing no copper, gold or cyanide;

(e) treating the loaded resin obtained in step (d) with an eluant containing copper cyanide at a CN:Cu ratio of between 3.5:1 and 4:1 and a copper concentration of at least 10 grams/liter thereby partially eluting copper cyanide and gold cyanide, if present, from the resin and producing an eluate having a CN:Cu ratio of less than 4:1; and (f) electrowinning copper metal and gold metal, if present, from the eluate produced in step (e).

There remains a need for improved and simpler processes employing anion exchange solvents or resins to concentrate solutions of cyanide prior to reuse, to allow for the economic recovery of copper in a versatile manner and to use cyanide ion ($CN^-$) as the eluant to produce eluates having low CN:Cu ratios of less than 3.5:1 moles of CN per mole of Cu.

SUMMARY OF THE INVENTION

Among the objects of the invention may be noted the provision of a process for recovering cyanide and optionally copper from feed material using a strong base anion exchange resin on which copper and cyanide are adsorbed and eluting the resin with free cyanide ion; the provision of such a process in which copper may be precipitated from the eluate resulting from the elution of the loaded resin with free cyanide ion; the provision of a process of the type described in which the resin resulting from the elution step may be conditioned for reuse in the initial resin loading step; the provision of such a process in which elution is carried out without the use of concentrated salts requiring rigorous control of water balance; the provision of a process which produces eluates having a low CN:Cu ratio; the provision of a process in which the copper content of the resin phase is advantageously made greater than about 0.7 moles of Cu per mole of active anion exchange resin sites; and the provision of a process in which the copper concentration in the resin phase is increased by limiting the flow of loaded resin to the subsequent elution step whereby the loaded resin will have a CN:Cu ratio of 2:1 or less and the eluates therefrom approach a CN:Cu ratio of approximately 2–3. Other objects and features will be in part apparent and in part pointed out hereinafter.

In one aspect, the present invention is directed to a process for recovering cyanide from feed material containing cyanide and copper comprising the steps of:

(a) contacting the feed material with a strong base anion exchange resin whereby copper and cyanide from the feed material are adsorbed onto the resin;

(b) contacting the resulting resin with an eluant solution containing free cyanide ion to elute copper and cyanide from the resin;

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali; and (h) returning the conditioned resin from step (f) to step (a) above.

In another aspect, the invention is directed to a process for recovering cyanide and optionally copper using a strong base anion exchange resin wherein cyanide soluble copper compounds are contained in the resin phase which is to be loaded with cyanide and copper and wherein the copper content of the resin phase is greater than about 0.7 moles of Cu per mole of active anion exchange sites.

In still another aspect, the invention is directed to a process for recovering cyanide and optionally copper using a strong base anion exchange resin wherein cyanide soluble copper compounds are contained in the resin phase which is to be loaded with cyanide and copper and wherein the flow of the loaded resin to a subsequent elution step is limited so that the loaded resin has a CN:Cu ratio of 2:1 or less and the eluates therefrom approach a CN:Cu ratio of approximately 2–3.

Other features of the processes of the invention will be discussed hereinafter.

DESCRIPTION OF THE PREFERRED EMBODIMENTS

Figure 1:
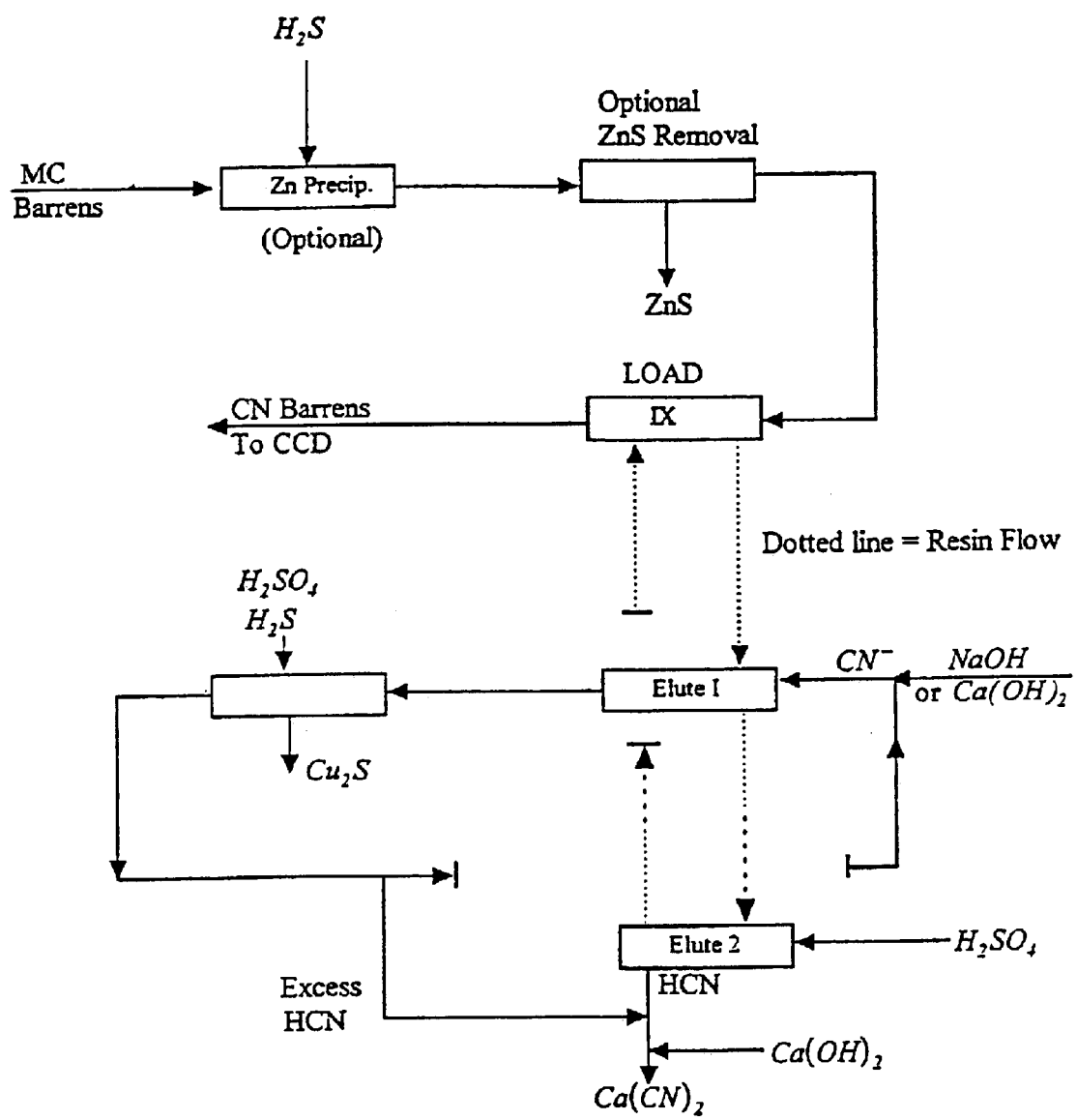
FIG. 1 is a flow diagram illustrating cyanide recovery from solutions or pulps containing copper by ion exchange using cyanide eluant in accordance with the process of the invention.

In the practice of the present invention, the feed material to be treated may be constituted by pulps or solutions containing copper and cyanide as well as other metal compounds. If the feed material contains zinc, it is preferred to optionally precipitate zinc from the feed material with soluble sulfide ions as the precipitating species before the anion exchange resin loading steps. Removal of the zinc sulfide precipitate is not always necessary as such precipitate will not load on the anion exchange resin.

The feed material is contacted with a strong base anion exchange resin until the resin is well loaded, i.e. most or practically all of the exchange sites on the resin are occupied by metal cyanide complexes or thiocyanate ion, $SCN^-$. The resin is a strong base anion exchange resin conditioned as described below in which the anion of the conditioning acid as described below has been largely displaced during the loading step. Various strong base anion exchange resins known to the art may be employed such as "Amberlite IRA 900-C" (Type I), "Amberlite IRA 904" (Type I) and "Amberlite IRA 910" (Type II) from Rohm and Haas, "Dowex M 41" (Type I), "Dowex MSA 1" (Type 1), "Dowex M 42" (Type 2), "Dowex MSA 2" (Type 2) and "Dowex 21K" (Gel) from Dow Chemical, and Lewatit "M 600" and "MP 500" from Bayer, and "A 500" and "A 500 U" from Purolite. The resin flow in this initial step is adjusted versus the feed material flow so that most or practically all of the copper and cyanide are removed from the feed material. The resin should not be overloaded which results when the resin phase contacts too much feed material to the point where copper and cyanide begin to leach out of the resin phase and the feed material being treated is no longer well depleted of copper and cyanide. After the resin is well loaded with cyanide metal complexes and/or $SCN^-$ anions, it is separated from the treated feed material. Other compounds of zinc or copper which complex with cyanide may also be added to the feed material to reduce the free cyanide concentration and the CN:CU molar ratio to facilitate loading.

The loaded resin is then contacted with an eluant solution containing free cyanide ion preferably in the form of NaCN or $Ca(CN)_2$. This results in the elution of part of the copper and cyanide from the resin. The amount of copper removed in this elution step is controlled to approximately match the amount of copper adsorbed in the resin loading step described above. Preferably, the eluant solution contains a quantity of cyanide ion that will produce an eluate of approximately three to four moles of cyanide per one mole of copper. The elution step is carried out without the use of concentrated salts requiring rigorous control of water balance. The eluted resin is separated from the eluting solution, optionally washed and then advanced to the conditioning step described hereinafter.

The eluate from the above described elution step is then acidified to precipitate copper therefrom. The copper may be precipitated as cuprous sulfide ($Cu_2S$), cuprous cyanide (CuCN) or cuprous thiocyanate (CuSCN) by the addition of an appropriate precipitating agent, e.g. to precipitate $Cu_2S$, a water soluble sulfide may be added. If HCl is used for precipitation, it can be derived from $H_2SO_4$ and $CaCl_2$. Any of the copper precipitates can be removed from the acidified eluant before or after the removal of HCN from the separated solution as described below.

The copper precipitates resulting from the precipitation step may be handled in a variety of further process steps in accordance with the invention. Any of the copper precipitates can be discarded to the tailings pond and cyanide destruction can be used to eliminate cyanide (CuCN) from the precipitate. Alternatively, any of the copper precipitates can be treated for residual HCN removal and then smelted or sent to smelters for copper recovery. In the event smelters prefer $Cu_2S$ over CuCN or CuSCN, the latter two cuprous compounds can be converted to $Cu_2S$ by contact with water soluble sulfide at the proper pH. If desired, CuCN and CuSCN can be fed to electrowinning cells for the production of copper cathodes with the cyanide being optionally recovered from these cells. Any of the copper precipitates can be partially recycled to the resin loading step described above to aid in adsorption of uncomplexed cyanide ion by means of the reaction of cyanide ion in the feed material with any of the copper precipitates to form copper cyanide complexes which load better than does cyanide ion, $CN^-$. This is especially advantageous when it is desired to force $SCN^-$ or other undesirable anions through the resin loading step with minimum adsorption on the resin. In a counter-current loading scheme, the CuSCN precipitate can be introduced toward the same end of the loading train where the eluted resin is introduced thereby encouraging SCN⁻ escape through the loading step.

After the acidified eluate is separated from the copper precipitate, the separate solution now containing HCN is further concentrated or is totally or partially alkalized and used in the above-mentioned elution step or in other places in the hydrometallurgical plant. Sodium hydroxide may be used for alkalizing the HCN solution to produce a sodium cyanide bearing eluate and a copper precipitate with little or no gypsum present. Cyanide for the elution step can also come from other sources. The HCN solution recycled to the leach can be alkalized with lime.

Any of the copper precipitates which are diluted with gypsum can be upgraded by a) selective precipitation in which part of the gypsum is precipitated with little or no copper product present; or b) flotation of a gypsum/copper precipitate to separate the copper compound from the gypsum.

The eluted resin from the above-described elution step, still containing some copper and cyanide, is then "conditioned" by contact with an acid during which more cyanide is removed as HCN while leaving most of the copper in the resin phase. The resin is separated from the acid solution containing HCN and the HCN solution converted directly to cyanide ion by alkali for use as appropriate or is first concentrated and then converted to cyanide ion. The resin, now "conditioned", is preferably first washed to recover residual HCN and acid and the "conditioned" resin is then returned to the initial resin loading step described above. Acceptable copper compounds remaining in the resin phase after the acid contact mentioned above are cuprous sulfide ($Cu_2S$), cuprous thiocyanate (CuSCN) and cuprous cyanide (CuCN).

In a refinement of the process of the invention for recovering cyanide and optionally copper using a strong base anion exchange resin wherein cyanide soluble copper compounds are contained in the resin phase which is to be loaded with cyanide and copper, it has been found advantageous for the copper content of the resin phase to be greater than about 0.7 moles of Cu per mole of active anion exchange resin sites.

In another refinement of the process of the invention, the copper concentration on the resin is intentionally increased thereby producing richer copper eluate solutions from the elution step described above. This increase in resin phase copper concentration is accomplished by limiting the flow of loaded resin, from the step wherein the feed material is contacted with the anion exchange resin, going to the step in which copper is eluted as described above. This results in only part of the loaded resin going to the copper elution step. In this refinement, the copper eluate will approach a CN:Cu mole ratio of 2:1 and less acid and base will be needed in the process. In this refinement, the loaded resin will have a CN:Cu ratio of 2:1 or less and the eluates will approach a CN:Cu ratio of approximately 2–3.

The overall processes of the present invention thus provide for the elution and recovery of copper and cyanide from anion exchange resins using cyanide ion (CN⁻) as the eluant to give eluates of less than 3.5:1 moles of CN per mole of Cu. The process of the invention is also capable of producing concentrated copper bearing eluates of over 50 grams of copper per liter of eluate. Such strong eluate solutions promote efficient, economic recovery of copper and cyanide therefrom.

The following examples illustrate the practice of the invention.

EXAMPLE 1

| Project LR130 | Test AFR Operator EM |
|---|---|
| Preparation of Feed 1 Solution for AFR Tests 1–3 | |
| Purpose: | To prepare a synthetic copper cyanide solution for AFR testwork. |
| Procedure: | The solution, saturated with gypsum and containing 400 mg/L Cu. 750 mg/L CN (CN:Cu mole ratio 4.6:1). 30 mg/L Zn and 350 mg/L SCN was prepared by dissolving 8.92 g NaCN 99%, 4.51 g CuCN, 1.06 g $ZnSO_4 \cdot 7H_2O$ and 4.69 g KSCN in water to 8 L The pH was adjusted to ~11 with lime. A head sample was taken for analysis of CN(T), Cu, Zn Ca and SCN. |
| Solution Composition: | ~8 L water saturated with $CaSO_4$<br>8.92 g NaCN (99%)<br>4.69 g KSCN<br>4.51 g CuCN.<br>1.06 g $ZnSO_4 \cdot 7H_2O$ |
| Results: | Feed 1 solution analyzed 641 mg/L CN(T), 403 mg/L Cu, 29.2 mg.L Zn, 595 mg/L Ca and 315 mg/L SCN. |

| Project LR-130 | Test AFR-1 Operator: EM |
|---|---|
| Purpose: | To conduct an AFR (Acidification, Filtration and Reneutralization) test on the AFR synthetic feed solution at pH 3. |
| Procedure: | The feed (1 L) was placed in a 2 L air-tight kettle. Mixing was provided with a large magnetic stir bar.<br>$H_2SO_4$ 9.8% solution was added to the kettle to adjust and maintain the solution at pH 3 for 60 minutes. Solution samples were taken at 5, 15, 30 and 60 and filtered on a milipore filter. The filter flask contained some NaOH to raise the pH of the filtrate to >11. The filtrates were analyzed for $CN_T$, SCN, Cu and Zn.<br>The final solution was filtered and the filter cake was washed with water. The washed |

-continued

| | |
|---|---|
| | cake was dried at ~80° C. for analysis of CN(T) and S(T). |
| Feed: | 1 L synthetic solution |
| | (641 mg/L CN(T), 403 mg L Cu, 29.2 mg/L Zn, 595 mg/L Ca and 315 mg/L SCN) |
| Temperature: | Ambient (~24° C.) |
| pH | 3 with 9.8% $H_2SO_4$ solution |
| Sampling: | 5, 15, 30 and 60 minutes |

(pH 3 with $H_2SO_4$)
Results:

| | Cumu. $H_2SO_4$ | | | | | | | Solid Assay | | | | Cyanide Balance | | |
|---|---|---|---|---|---|---|---|---|---|---|---|---|---|---|
| | 9.8% Sol. Added | Equiv. 100% $H_2SO_4$ | | Solution Analysis | | | Dry | | | | | In | In | |
| Time min | g | g/L | $CN_T$ mg/L | CNS mg/L | Cu mg/L | Zn mg/L | Wt. g | $CN_T$ % | $S_T$ % | Cu % | Zn % | Solution* % | Precip. % | Total % |
| | | | 641 | 315 | 403 | 29.2 | — | — | — | — | — | — | — | — |
| 5 | 20 | 2.0 | 484 | 291 | 36.0 | 28.3 | | | | | | 77.0 | | |
| 15 | 21 | 2.1 | 477 | 279 | 34.0 | 25.6 | | | | | | 76.0 | | |
| 30 | 22 | 2.2 | 515 | 287 | 34.6 | 26.8 | | | | | | 82.1 | | |
| 60 | 22 | 2.2 | 475 | 242 | 39.3 | 26.4 | 0.52 | 13.4 | 9.77 | NA | NA | 75.7 | 10.9 | 86.6 |

*Taking into account volume changes
NA: not analyzed
Feed volume: 1 L
AVR Recoverable CN in Feed: 476 mg/L
CN Recovery: 485 mg/L feed or 102% AVR recoverable
Notes:
$CN_{WAD} = CN_T - CN$ in $Fe(CN)_4 = CN_T$
AVR Recoverable CN = $CN_{WAD} - CN$ in CuCN precipitate

| | |
|---|---|
| Project LR-130 | Test AFR-2 Operator: EM |
| Purpose: | To conduct an AFR (Acidification, Filtration and Reneutralization) test on the AFR synthetic feed solution at pH 2. |
| Procedure: | The feed (1 L) was placed in a 2 L air-tight kettle. Mixing was provided with a large magnetic stir bar. |
| | $H_2SO_4$ 9.8% solution was added to the kettle to adjust and maintain the solution at pH 2 for 60 minutes. Solution samples were taken at 5, 15, 30 and 60 and filtered on a milipore filter. Tne filter flask contained some NaOH to raise the pH of the filtrate to >11. The filtrates were analyzed for $CN_T$, SCN, Cu and Zn. |
| | The final solution was filtered and the filter cake was washed with water. The washed cake was dried at ~80° C. for analysis of CN(T) and S(T). |
| Feed: | 1 L synthetic solution |
| | (641 mg/L CN(T), 403 mg/L Cu, 29.2 mg/L Zn, 595 mg/L Ca and 315 mg/L SCN) |
| Temperature: | Ambient (~24° C.) |
| pH | 2 with 9.8% $H_2SO_4$ solution |
| Sampling: | 5, 15, 30 and 60 minutes |

(pH 2 with $H_2SO_4$)
Results:

| | Cumu. $H_2SO_4$ | | | | | | | Solid Assay | | | | Cyanide Balance | | |
|---|---|---|---|---|---|---|---|---|---|---|---|---|---|---|
| | 9.8% Sol. Added | Equiv. 100% $H_2SO_4$ | | Solution Analysis | | | Dry | | | | | In | In | |
| Time min | g | g/L | $CN_T$ mg/L | CNS mg/L | Cu mg/L | Zn mg/L | Wt. g | $CN_T$ % | $S_T$ % | Cu % | Zn % | Solution* % | Precip. % | Total % |
| | | | 641 | 315 | 403 | 29.2 | — | — | — | — | — | — | — | — |
| 5 | 30 | 2.9 | 475 | 22 | 3.13 | 30.3 | | | | | | 76.3 | | |
| 15 | 31 | 3.0 | 461 | 16 | 5.99 | 28.4 | | | | | | 74.1 | | |
| 30 | 31 | 3.0 | 574 | 15 | 12.1 | 25.6 | | | | | | 92.3 | | |
| 60 | 31 | 3.0 | 477 | 20 | 21.1 | 28.4 | 0.61 | 0.59 | 24.6 | NA | NA | 76.6 | 0.6 | 77.2 |

*Taking into account volume changes
NA: not analyzed
Feed volume: 1 L
AVR Recoverable CN in Feed: 476 mg/L
CN Recovery: 491 mg/L feed or 103% AVR recoverable -continued Notes:
$CN_{WAD} = CN_T - CN$ in $Fe(CN)_4 = CN_T$
AVR Recoverable CN = $CN_{WAD}$ −CN in CuCN precipitate

| Project LR-130 | Test AFR-3 Operator: EM |
|---|---|
| Purpose: | To conduct an APR (Acidification, Filtration and Reneutralization) test on the AFR synthetic feed solution at pH 2 using $H_2SO_3$. |
| Procedure: | The feed (1 L) was placed in a 2 L air-tight kettle. Mixing was provided with a large magnetic stir bar.<br>$H_2SO_3$ 7.8% solution was added to the kettle to adjust and maintain the solution at pH 2 for 60 minutes. Solution samples were taken at 5, 15, 30 and 60 and filtered on a milipore filter. The filter flask contained some NaOH to raise the pH of the filtrate to >11. The filtrates were analyzed for $CN_T$, SCN, Cu and Zn.<br>The final solution was filtered and the filter cake was washed with water. The washed cake was dried at ~80° C. for analysis of CN(T) and S(T). |
| Feed: | 1 L synthetic solution<br>(641 mg/L CN(T), 403 mg/L Cu, 29.2 mg/L Zn, 595 mg/L Ca and 315 mg/L SCN) |
| Temperature: | Ambient (~24° C.) |
| pH | 2 with 7.8% $H_2SO_3$ solution |
| Sampling: | 5, 15, 30 and 60 minutes |

(pH 2 with $H_2SO_3$)
Results:

| | Cumu. $H_2SO_4$ | | | | | | | Solid Assay | | | | Cyanide Balance | | |
|---|---|---|---|---|---|---|---|---|---|---|---|---|---|---|
| | 9.8% Sol. | Equiv. 100% | Solution Analysis | | | | Dry | | | | | In Solution* | In Precip. | Total |
| Time min | Added g | $H_2SO_4$ g/L | $CN_T$ mg/L | CNS mg/L | Cu mg/L | Zn mg/L | Wt. g | $CN_T$ % | $S_T$ % | Cu % | Zn % | % | % | % |
| | | | 641 | 315 | 403 | 29.2 | — | — | — | — | — | — | — | — |
| 5 | | | 456 | 38 | 5.51 | 25.5 | | | | | | 71.1 | | |
| 15 | | | 456 | 1184 | 4.03 | 27.0 | | | | | | 71.1 | | |
| 30 | | | 465 | 1212 | 3.56 | 26.3 | | | | | | 72.5 | | |
| 60 | Not recorded | | 452 | 1190 ? | 3.74 | 26.7 | 0.70 | 1.54 | 23.6 | NA | NA | 74.7 | 1.7 | 76.4 |

*Taking into account volume changes
NA: not analyzed
Feed volume: 1 L
AVR Recoverable CN in Feed: 476 mg/L
CN Recovery: 479 mg/L feed or 101% AVR recoverable
Notes:
$CN_{WAD} = CN_T - CN$ in $Fe(CN)_4 = CN_T$
AVR Recoverable CN = $CN_{WAD}$ −CN in CuCN precipitate

| Project LR130 | Test AFR-4 Operator ME |
|---|---|
| Preparation of Feed 2 Solution for AFR-4 | |
| Purpose: | To prepare a synthetic copper cyanide solution for AFR testwork. |
| Procedure: | The solution, saturated with gypsum and containing 500 mg/L Cu, 920 mg/L CN (CN:Cu mole ratio 4.6:1), 30 mg/L Zn and 350 mg/L SCN, was prepared by dissolving the require amounts of NaCN, CuCN, $ZnSO_4.7H_2O$ and KSCN in water.<br>The pH was adjusted to ~11 with lime. A head sample was taken for analysis of CN(T), Cu, Zn Ca and SCN. |
| Solution Composition: | ~2 L water saturated with $CaSO_4$<br>2.84 g NaCN (95%)<br>1.17 g KSCN<br>1.41 g CuCN,<br>0.26 g $ZnSO_{40}.7H_2O$ |
| Results: | The solution analyzed 936 mg/L CN(T), 472 mg/L Cu, 42.9 mg/L Zn, 577 mg/L Ca and 401 mg/L SCN. |

| Project LR-130 | Test AFR-4 Operator: EM |
|---|---|
| Purpose: | To conduct an AFR (Acidification, Filtration and Reneutralization) test on the AFR synthetic feed solution (500 mg/L Cu, 350 mg/L SCN, 920 mg/L CN and 30 mg/L Zn) at pH 2. |
| Procedure: | The feed (1 L) was placed in a 2 L air-tight kettle. Mixing was provided with a large magnetic stir bar. $H_2SO_4$ 19.5% solution was added to the kettle to adjust and maintain the solution at pH 2 for 60 minutes. Solution samples were taken at 5, 15, 30 and 60 and filtered on a milipore filter. The filter flask contained some NaOH to raise the pH of the filtrate to >11. The filtrates were analyzed for $CN_T$, SCN, Cu and Zn. The final solution was filtered and the filter cake was washed with water. The washed cake was dried at ~80° C. for analysis of CN(T), Cu, Zn and S(T). |
| Feed: | 1 L synthetic solution (Feed 2) (936 mg/L CN(T), 472 mg/L Cu, 42.9 mg/L Zn, 577 mg/L Ca and 416 mg/L SCN) |
| Temperature: | Ambient (~26° C.) |
| pH | 2 with 19.5% $H_2SO_4$ solution |
| Sampling: | 5, 15, 30 and 60 minutes |

(pH 2 with $H_2SO_4$) Results:

| | Cumu. $H_2SO_4$ | | | | | | | Solid Assay | | | | Cyanide Balance | | |
|---|---|---|---|---|---|---|---|---|---|---|---|---|---|---|
| | 19.5% Sol. | Equiv. 100% | | Solution Analysis | | | Dry | | | | | | In | In |
| Time min | Added g | $H_2SO_4$ g/L | $CN_T$ mg/L | CNS mg/L | Cu mg/L | Zn mg/L | Wt. g | $CN_T$ % | $S_T$ % | Cu % | Zn % | Solution* % | Precip. % | Total % |
| Feed 2 | — | — | 936 | 401 | 472 | 42.9 | — | — | — | — | — | — | — | — |
| 5 | 16.1 | 3.1 | 806 | 43 | 5.78 | 37.7 | | | | | | 87.5 | | |
| 15 | 16.1 | 3.1 | 806 | 34 | 7.17 | 36.3 | | | | | | 87.5 | | |
| 30 | 16.1 | 3.1 | 835 | 33 | 8.96 | 35.4 | | | | | | 90.6 | | |
| 60 | 16.1 | 3.1 | 814 | 29 | 12.0 | 35.0 | 0.85 | 2.77 | 23.1 | 51.8 | 0.04 | 88.4 | 2.5 | 90.9 |

*Taking into account volume changes
NA: not analyzed
Feed volume: 1 L
AVR Recoverable CN in Feed: 743 mg/L
CN Recovery: 827 mg/L feed or 111% AVR recoverable
Notes:
$CN_{WAD} = CN_T - $ CN in $Fe(CN)_4 = CN_T$
AVR Recoverable CN = $CN_{WAD}$ − CN in CuCN precipitate

| Project LR130 | Test AFR-5 Operator ME |
|---|---|
| Preparation of Feed 3 Solution for Test AFR-5 | |
| Purpose: | To prepare a synthetic copper cyanide solution for AFR testwork. |
| Procedure: | The solution, saturated with gypsum and containing ~500 mg/L Cu, ~920 mg/L CN (CN:Cu mole ratio 4.6:1), 30 mg/L Zn and 350 mg/L SCN, was prepared by dissolving the require amounts of NaCN, CuCN, $ZnSO_{4O}.7H_2O$ and KSCN in water. The pH was adjusted to ~11 with lime. A head sample was taken for analysis of CN(T), Cu, Zn Ca and SCN. |
| Solution Composition: | ~2 L water saturated with $CaSO_4$ 2.84 g NaCN (95%) 1.17 g KSCN 1.41 g CuCN, 0.26 g $ZnSO_{4O}.7H_2O$ |
| Results: | The solution analyzed 1060 mg/L CN(T), 500 mg/L Cu, 54 mg/L Zn, 540 mg/L Ca and 328 mg/L SCN. |

| Project LR-130 | Test AFR-5 Operator: EM |
|---|---|
| Purpose: | To conduct an AFR (Acidification, Filtration and Reneutralization) test on the AFR synthetic feed solution (500 mg/L Cu, 350 mg/L SCN. 920 mg/L CN and 30 mg, L Zn) at pH 2. |

-continued

| Procedure: | The feed (1 L) was placed in a 2 L air-tight kettle. Mixing was provided with a large magnetic stir bar. $H_2SO_4$ 19.5% solution was added to the kettle to adjust and maintain the solution at pH 2 for 60 minutes. Solution samples were taken at 5, 15, 30 and 60 and filtered on a milipore filter. The filter flask contained some NaOH to raise the pH of the filtrate to >11. The filtrates were analyzed for $CN_T$, SCN, Cu and Zn. The final solution was filtered and the filter cake was washed with water. The washed cake was dried at ~80° C. for analysis of CN(T), Cu, Zn and S(T). |
|---|---|
| Feed: | 1 L synthetic solution (Feed 3) (1060 mg/L CN(T), 500 mg/L Cu, 54 mg L Zn, 540 mg L Ca and 328 mg/L SCN) |
| Temperature: | Ambient (~26° C.) |
| pH | 2 with 19.5% $H_2SO_4$ solution |
| Sampling: | 5, 15, 30 and 60 minutes |

(pH 2 with $H_2SO_4$)
Results:

| | Cumu. $H_2SO_4$ | | | | | | | Solid Assay | | | | Cyanide Balance | | |
|---|---|---|---|---|---|---|---|---|---|---|---|---|---|---|
| | 19.5% | Equiv. | | | | | | | | | | | In | In |
| | Sol. | 100% | Solution Analysis | | | | Dry | | | | | | | |
| Time min | Added g | $H_2SO_4$ g/L | $CN_T$ mg/L | CNS mg/L | Cu mg/L | Zn mg/L | Wt. g | $CN_T$ % | $S_T$ % | Cu % | Zn % | Solution* % | Precip. % | Total % |
| 0 | — | — | 1060 | 328 | 500 | 54.0 | — | — | — | — | — | — | — | |
| 5 | 13.9 | 2.7 | 749 | 83 | 7.78 | 41.0 | | | | | | 71.6 | | |
| 15 | 14.5 | 2.8 | 835 | 65 | 8.40 | 39.0 | | | | | | 79.9 | | |
| 30 | 14.5 | 2.8 | 835 | 61 | 9.70 | 41.0 | | | | | | 79.9 | | |
| 60 | 14.5 | 2.8 | 807 | 50 | 2.59 | 41.0 | 0.90 | 6.48 | 18.2 | 50.1 | 0.03 | 77.2 | 5.5 | 82.7 |

*Taking into account volume changes
NA: not analyzed
Feed volume: 1 L
AVR Recoverable CN in Feed: 855 mg/L
CN Recovery: 819 mg/L feed or 96% AVR recoverable
Notes:
$CN_{WAD} = CN_T - $ CN in $Fe(CN)_4 = CN_T$
AVR Recoverable CN = $CN_{WAD}$ ⁻CN in CuCN precipitate

| Project LR130 | Test AFR-6 Operator ME |
|---|---|

Preparation of Feed 4 Solution for Test AFR-6

| Purpose: | To prepare a synthetic copper cyanide solution for AFR testwork |
|---|---|
| Procedure: | The solution, saturated with gypsum and containing ~500 mg/L Cu, ~820 mg/L CN (CN:Cu mole ratio 4:1), 30 mg/L Zn and 350 mg/L SCN, was prepared by dissolving the require amounts of NaCN, CuCN, $ZnSO_{40}\cdot 7H_2O$ and KSCN in water. The pH was adjusted to ~11 with lime. A head sample was taken for analysis of CN(T), Cu, Zn Ca and SCN. |
| Solution Composition: | ~2 L water saturated with $CaSO_4$ 2.44 g NaCN (95%) 1.17 g KSCN 1.41 g CuCN, 0.26 g $ZnSO_{40}\cdot 7H_2O$ |
| Results: | Feed 4 solution analyzed 1010 mg/L CN(T), 514 mg/L Cu, 39.3 mg/L Zn, 763 mg/L Ca and 308 mg/L SCN. |

| Project LR-130 | Test AFR-6 Operator: ME |
|---|---|
| Purpose: | To conduct an AFR (Acidification, Filtration and Reneutralization) test on the AFR synthetic feed solution (500 mg/L Cu, 350 mg L SCN, 820 mg/L CN and 30 mg/L Zn) at pH 2. |
| Procedure: | The feed (1 L) was placed in a 2 L air-tight kettle. Mixing was provided with a large magnetic stir bar. $H_2SO_4$ 19.5% solution was added to the kettle to adjust and maintain the solution at pH 2 for 60 minutes. Solution samples were taken at 5, 15, 30 and 60 and filtered on a milipore filter. The filter flask contained some NaOH to raise the pH of the filtrate to >1 The filtrates were analyzed for $CN_T$, SCN, Cu and Zn. The final solution was filtered and the filter cake was washed with water. The washed |

-continued

| | |
|---|---|
| | cake was dried at ~80° C. for analysis of CN(T), Cu, Zn and S(T). |
| Feed: | 1 L synthetic solution (Feed 4) |
| | (1010 mg/L CN(T), 514 mg/L Cu, 39.3 mg/L Zn, 763 mg/L Ca and 308 mg/L SCN) |
| Temperature: | Ambient (~26° C.) |
| pH | 2 with 19.5% $H_2SO_4$ solution |
| Sampling: | 5, 15, 30 and 60 minutes |

(pH 2 with $H_2SO_4$)
Results:

| | Cumu. $H_2SO_4$ | | | | | | Solids Assay | | | | | Cyanide Balance | | |
|---|---|---|---|---|---|---|---|---|---|---|---|---|---|---|
| | 19.5% Sol. | Equiv. 100% | Solution Analysis | | | | Dry | | | | | In | In | |
| Time min | Added g | $H_2SO_4$ g/L | $CN_T$ mg/L | CNS mg/L | Cu mg/L | Zn mg/L | Wt. g | $CN_T$ % | $S_T$ % | Cu % | Zn % | Solution* % | Precip. % | Total % |
| Feed 4 | — | — | 1010 | 308 | 514 | 39.3 | — | — | — | — | — | — | — | — |
| 5 | 15.1 | 2.9 | 890 | 45 | 6.78 | 35.9 | | | | | | 89.4 | | |
| 15 | 15.1 | 2.9 | 845 | 38 | 7.50 | 36.7 | | | | | | 84.9 | | |
| 30 | 15.1 | 2.9 | 845 | 35 | 9.62 | 36.5 | 1.22 | 4.26 | 19.8 | 35.8 | 0.01 | 84.9 | | |
| 60 | 15.1 | 2.9 | 850 | 35 | 18.5 | 36.9 | 1.22 | 4.26 | 19.8 | 35.8 | 0.01 | 85.4 | 5.1 | 90.6 |

*Taking into account volume changes
NA: not analyzed
Feed volume: 1 L
AVR Recoverable CN in Feed: 800 mg/L
CN Recovery: 863 mg/L feed or 108% AVR recoverable
Notes:
$CN_{WAD} = CN_T - CN$ in $Fe(CN)_4 = CN_T$
AVR Recoverable CN = $CN_{WAD}$ −CN in CuCN precipitate

---

| | |
|---|---|
| Project LR130 | Test AFR-7 Operator ME |
| Preparation of Feed 5 Solution for Test AFR-7 | |
| Purpose: | To prepare a synthetic copper cyanide solution for AFR testwork |
| Procedure: | The solution, saturated with gypsum and containing 400 mg/L Cu. 750 mg/L CN (CN:Cu mole ratio 4.6:1). 30 mg/L Zn and 350 mg/L SCN was prepared by dissolving 1.95 g NaCN 95%, 1.13 g CuCN, 0.26 g $ZnSO_{40}.7H_2O$ and 1.17 g KSCN in water to 2 L The pH was adjusted to ~11 with lime. A head sample was taken for analysis of CN(T), Cu, Zn Ca and SCN. |
| Solution Composition: | ~2 L water saturated with $CaSO_4$ |
| | 1.95 g NaCN (95%) |
| | 1.17 g KSCN |
| | 1.13 g CuCN. |
| | 0.26 g $ZnSO_{40}7H_2O$ |
| Results: | Feed 5 solution analyzed 634 mg/L CN(T), 374 mg/L Cu, 37.8 mg.L Zn, 645 mg/L Ca and 339 mg/L SCN. |

---

| | |
|---|---|
| Project LR-130 | Test AFR-7 Operator: EM |
| Purpose: | To conduct an AFR (Acidification, Filtration and Reneutralization) test on the AFR synthetic feed solution at pH 1.5. |
| Procedure: | The feed (1 L) was placed in a 2 L air-tight kettle. Mixing was provided with a large magnetic stir bar. |
| | $H_2SO_4$ 19.5% solution was added to the kettle to adjust and maintain the solution at pH 1.5 for 60 minutes. Solution samples were taken at 5, 15, 30 and 60 and filtered on a milipore filter. The filter flask contained some NaOH to raise the pH of the filtrate to >11. The filtrates were analyzed for $CN_T$, SCN, Cu and Zn. |
| | The final solution was filtered and the filter cake was washed with water. The washed cake was dried at ~80° C. for analysis of CN(T) and S(T). |
| Feed: | 1 L Feed 5 synthetic solution |
| | (634 mg/L CN(T), 374 mg/L Cu, 37.8 mg L Zn, 645 mg/L Ca and 339 mg/L SCN) |
| Temperature: | Ambient (~23° C.) |
| pH | 1.5 with 19.5% $H_2SO_4$ solution |
| Sampling: | 5, 15, 30 and 60 minutes |

-continued (pH 1.5 with $H_2SO_4$)
Results:

| | Cumu. $H_2SO_4$ | | | Solution Analysis | | | Dry Solid Assay | | | | | Cyanide Balance | | |
| | 19.5% Sol. Added | Equiv. 100% $H_2SO_4$ | | | | | Wt. | $CN_T$ | $S_T$ | Cu | Zn | In Solution* | In Precip. | Total |
| Time min | g | g/L | $CN_T$ mg/L | CNS mg/L | Cu mg/L | Zn mg/L | g | % | % | % | % | % | % | % |
|---|---|---|---|---|---|---|---|---|---|---|---|---|---|---|
| Feed | | | 634 | 339 | 374 | 37.8 | — | — | — | — | — | — | — | — |
| 5 | 18.9 | 3.7 | 563 | 23 | 5.55 | 38.0 | | | | | | 90.5 | | |
| 15 | 18.9 | 3.7 | 602 | 19 | 8.65 | 34.0 | | | | | | 96.7 | | |
| 30 | 18.9 | 3.7 | 589 | 17 | 13.3 | 36.5 | | | | | | 94.7 | | |
| 60 | 18.9 | 3.7 | 595 | 17 | 195. | 37.0 | 0.62 | 0.89 | 25.4 | 54.6 | 0.008 | 95.6 | 0.9 | 96.5 |

*Taking into account volume changes
NA: not analyzed
Feed volume: 1 L
AVR Recoverable CN in Feed: 481 mg/L
CN Recovery: 606 mg/L feed or 126% AVR recoverable
Notes:
$CN_{WAD} = CN_T - CN$ in $Fe(CN)_4 = CN_T$
AVR Recoverable CN = $CN_{WAD} - CN$ in CuCN precipitate

| Test | pH | Ret. Time min | $H_2SO_4$ Consu. g/L Sol. | $H_2SO_4$ Consu. g/L Sol. | CN(T) mg/L | SCN mg/L | Cu mg/L | Zn mg/L | Cu mg/L | Wt. g/L | CN(T) % | S(T) % | Cu % | Zn % | Sol'n % | in Ppt | Total % |
|---|---|---|---|---|---|---|---|---|---|---|---|---|---|---|---|---|---|
| Feed 1 | ~11 | — | — | — | 641 | 315 | 403 | 29.2 | 595 | — | — | — | — | — | — | — | — |
| AFR-1 | 3.0 | 5 | 2.0 | — | 484 | 291 | 36.0 | 28.3 | | | | | | | 77.0 | | |
| | 3.0 | 15 | 2.1 | — | 477 | 279 | 34.0 | 25.6 | | | | | | | 76.0 | | |
| | 3.0 | 30 | 2.2 | — | 515 | 287 | 34.6 | 26.8 | | | | | | | 82.1 | | |
| | 3.0 | 60 | 2.2 | — | 475 | 242 | 39.3 | 26.4 | | 0.52 | 13.4 | 9.77 | NA | NA | 75.7 | 10.9 | 86.6 |
| AFR-2 | 2.0 | 5 | 2.9 | — | 475 | 22 | 3.13 | 30.3 | | | | | | | 76.3 | | |
| | 2.0 | 15 | 3.0 | — | 461 | 16 | 5.99 | 28.4 | | | | | | | 74.1 | | |
| | 2.0 | 30 | 3.0 | — | 574 | 15 | 12.1 | 25.6 | | | | | | | 92.3 | | |
| | 2.0 | 60 | 3.0 | — | 477 | 20 | 21.1 | 28.4 | | 0.61 | 0.59 | 24.6 | NA | NA | 76.6 | 0.6 | 77.2 |
| AFR-3 | 2.0 | 5 | — | ND | 456 | 38 | 5.51 | 25.5 | | | | | | | 71.1 | | |
| | 2.0 | 15 | — | ND | 456 | | 4.03 | 27.0 | | | | | | | 71.1 | | |
| | 2.0 | 30 | — | ND | 465 | | 3.56 | 26.3 | | | | | | | 72.5 | | |
| | 2.0 | 60 | — | ND | 452 | | 3.74 | 26.7 | | 0.70 | 1.54 | 23.6 | NA | NA | 74.7 | 1.7 | 76.4 |

$CN_{WAD} = CN_T - CN$ in $Fe(CN)_4$
AVR Recoverable CN = $CN_{WAD} - CN$ in CuCN precipitate = 476 mg/L Feed 1
ND: not determined

| Test | pH | Ret. Time min | $H_2SO_4$ Consu. g/L Sol. | $H_2SO_4$ Consu. g/L Sol. | CN(T) mg/L | SCN mg/L | Cu mg/L | Zn mg/L | Ca mg/L | Wt. g/L | CN(T) % | S(T) % | Cu % | Zn % | Sol'n % | in Ppt | Total % |
|---|---|---|---|---|---|---|---|---|---|---|---|---|---|---|---|---|---|
| Feed 2 | ~11 | — | — | — | 936 | 401 | 472 | 42.9 | 577 | — | — | — | — | — | — | — | — |
| AFR-4 | 2.0 | 5 | 3.1 | — | 806 | 43 | 5.78 | 37.7 | | | | | | | 87.5 | | |
| | 2.0 | 15 | 3.1 | — | 806 | 34 | 7.17 | 36.3 | | | | | | | 87.5 | | |
| | 2.0 | 30 | 3.1 | — | 835 | 33 | 8.96 | 35.4 | | | | | | | 90.6 | | |
| | 2.0 | 60 | 3.1 | — | 814 | 29 | 12.0 | 35.0 | | 0.85 | 2.77 | 23.1 | 51.6 | 0.04 | 88.4 | 2.5 | 90.9 |
| Feed 3 | ~11 | — | — | — | 1060 | 328 | 500 | 54.0 | 540 | — | — | — | — | — | — | — | — |
| AFR-5 | 2.0 | 5 | 3.1 | — | 749 | 83 | 7.78 | 41.0 | | | | | | | 71.6 | | |
| | 2.0 | 15 | 3.1 | — | 835 | 65 | 8.40 | 39.0 | | | | | | | 79.9 | | |
| | 2.0 | 30 | 3.1 | — | 835 | 61 | 9.70 | 41.0 | | | | | | | 79.9 | | |
| | 2.0 | 60 | 3.1 | — | 807 | 50 | 2.59 | 41.0 | | 0.90 | 6.48 | 18.2 | 50.1 | 0.03 | 77.2 | 5.5 | 82.7 |
| Feed 4 | ~11 | — | — | — | 1010 | 308 | 514 | 39.3 | 763 | — | — | — | — | — | — | — | — |
| AFR-6 | 2.0 | 5 | 2.9 | — | 890 | 45 | 6.78 | 35.9 | | | | | | | 89.4 | | |
| | 2.0 | 15 | 2.9 | — | 845 | 33 | 7.50 | 36.7 | | | | | | | 84.9 | | |
| | 2.0 | 30 | 2.9 | — | 845 | 35 | 9.62 | 36.5 | | | | | | | 84.9 | | |
| | 2.0 | 60 | 2.9 | — | 850 | 35 | 18.5 | 36.9 | | 1.22 | 4.26 | 19.8 | 35.8 | 0.01 | 85.4 | 5.1 | 90.6 |
| Feed 5 | ~11 | — | — | — | 634 | 339 | 374 | 37.8 | 645 | — | — | — | — | — | — | — | — |
| AFR-7 | 1.5 | 5 | 3.7 | — | 563 | 23 | 5.55 | 38.0 | | | | | | | 90.5 | | |
| | 1.5 | 15 | 3.7 | — | 602 | 19 | 8.65 | 34.0 | | | | | | | 96.7 | | |
| | 1.5 | 30 | 3.7 | — | 589 | 17 | 13.3 | 36.5 | | | | | | | 94.7 | | |
| | 1.5 | 60 | 3.7 | — | 595 | 17 | 19.5 | 37.0 | | 0.62 | 0.89 | 25.4 | 54.6 | 0.008 | 95.6 | 0.9 | 96.5 |

-continued $CN_{WAD} = CN_T - CN$ in $Fe(CN)_4$
AVR Recoverable CN = $CN_{WAD}$ −CN in CuCN precipitate = 743 mg/L Feed 2, 855 mg/L Feed 3, 800 mg/L Feed 4, 481 mg/L Feed 5.

---

Project LR-130  Test TH-1  Operator: ME

| | |
|---|---|
| Purpose: | Scoping tests to select flocculant. |
| Procedure: | The feed solution prepared in Test AFR-4 was used to produce a slurry for the scoping testwork. The feed solution (800 mL) was adjusted to and maintained at pH 2 with dilute sulphuric acid for 1 hour. The slurry was used as feed for the scoping testwork. Three types of flocculants were evaluated: Cationic - low pH slurries, acid and aqueous leach metallurgical processes Non-Ionic - general purpose Anionic - under neutral and alkaline conditions 1) E-10 (anionic, very high molecular weight) 0.1% 2) P156 (anionic, high molecular weight) 0.1% 3) P352 (cationic, medium molecular weight) 0.1% 4) P351 (non-ionic, high molecular weight) 0.1% 5) Nil Scoping test was carried out in a small beaker using 100 mL of feed. The feed was stirred gently. Flocculant was gradually added and observations were made concerning the settling rate and the clarity of the supernatant solution. |

Results:

| Test/Time | | Cumulative Dosage | | Floc | Relative | Supernatant |
|---|---|---|---|---|---|---|
| min | Flocculant | Drops | g/m³ | Size | Settling Rate | Solution |
| Test 1-1 | E-10 | 11 | 1.98 | Medium | Medium | Cloudy |
| | | 16 | 2.88 | Over flocc'd | Medium | Sl. cloudy |
| 10 | | | | | | Sl. cloudy |
| 60 | | | | | | Clear |
| Test 1-2 | P156 | 12 | 2.16 | Medium | Medium | Sl. cloudy |
| | | | 3.06 | Over flocc'd | Medium | Sl. cloudy |
| 10 | | | | | | Very Sl. cloudy (<E-10) |
| 60 | | | | | | Clear |
| Test 1-3 | P352 | 3 | 0.54 | Medium | Medium | Cloudy |
| | | 6 | 1.08 | Over flocc'd | Medium | Sl. cloudy |
| 10 | | | | | | Very Sl. cloudy |
| 60 | | | | | | Clear |
| Test 1-4 | P351 | 1 | 0.18 | Medium | Medium | Cloudy |
| | | 3 | 0.54 | Over flocc'd | Medium | Sl. cloudy |
| | | 6 | 1.08 | Over flocc'd | Medium | Sl. cloudy |
| 10 | | | | | | Very Sl. cloudy |
| 60 | | | | | | Clear |
| Test 1-5 | Nil | | | Small | Slow | Very cloudy |
| 10 | | | | | | Cloudy |
| 60 | | | | | | Sl. cloudy |

P351 produced large floccs but the supernatant was clear, settling rate was good and required a lowest dosage.

---

Project LR130  Test Cu-L1  Operator: ME

| | |
|---|---|
| Purpose: | To prepare a batch of M41 resin loaded with $Cu(CN)_4^{3-}$. |
| Procedure: | The feed solution containing 5 g/L SCN, 20 g/L Cu and 32.8 g/L CN (CN:Cu mole ratio ~4.0:1) was prepared by dissolving 93.4 g NaCN (99%), 56.4 g CuCN and 16.7 g KSCN in deionized water to 2 L. The solution was adjusted to pH 11 with NaOH. A 10 mL head sample was submitted for analysis of CN, SCN and Cu. Resin loading was carried out by contacting 500 mL of M41 resin (−20 mesh) in a bottle with 2 of feed solution for 24 hours. Following loading, the resin was recovered and washed with 3 × 500 mL of DIW. The barren solution was assayed for $CN_T$, SCN and Cu. |
| Resin: | 500 mL M41 fresh resin (−20 mesh) |
| Feed Solution: | 2 L containing 5 g/L SCN, 20 g/L Cu and 32.8 g/L CN (CN:Cu mole ratio ~4.0:1) |
| Temperature: | ~20° C. |
| Method: | Bottle on roller |

| | | | Concentration (mg/L, %) | | | |
|---|---|---|---|---|---|---|
| | Volume | Mass | | | CN:Cu | |
| Increment | mL | g | CN | Cu | M/M | SCN |
| Feed resin* | 500 | | | | | |
| Feed solution | 2000 | | 32800 | 19000 | 4.2 | 4760 |
| Barren solution | 2100 | | 19800 | 11800 | 4.1 | 1650 |
| Loaded resin calc. | 437 | 145 | 16.5 | 9.10 | 4.4 | 4.17 |
| Loaded resin assay | 437 | 145 | 13.2 | 8.62 | 3.7 | 2.79 |

*Wet settled resin containing some water

EXAMPLE 2

| | |
|---|---|
| Project 4424-116 | Test IX- 3A to C |
| Purpose: | To conduct resin loading tests using stripped resin from Test IX- 3 |
| Procedure: | A synthetic solution (Feed IX-7) containing approximately |
| | 110 mg/L Cu |
| | 60 mg/L Zn |
| | 410 mg/L CN |
| | 300 mg/L SCN |
| | 9.1 CN:Cu mole ratio |
| | was prepared for the teswork by dissolving NaCN, |
| | CuCN and KSCN in deionized water. |
| | Resin adsorption was carried our by contacting |
| | the stripped resin with the solution, |
| | at three solution-to-resin ratios, in a bottle placed on |
| | a roller for 24 hours. The solution |
| | was maintained at approximately pH 10.5 during loading. |
| | The resin was recovered and washed with water. |
| | The resin was analyzed for Cu (by XRF), |
| | $S_T$ and $CN_T$. |
| | A sample of the barren solution was analyzed |
| | for Cu, Zn, SCN and $CN_T$. |
| Loading Solution: | Feed IX-7 solution |
| Resin: | Stripped resin from Test IX- 3 |
| Temperature | Ambient |
| pH: | 10.5–11 with NaOH |
| Method: | Bottle on roller |

| | | Analysis (mg/L. %) | | | | | | |
|---|---|---|---|---|---|---|---|---|
| Test | Volume mL | CN(T) | Zn | Cu | CN:Cu M/M | S(T) | SCN | SCN cal. from S |
| IX-3A | | | | | | | | |
| Feed Solution | 1465 | 422 | 60.5 | 111 | 7.2 | NA | 280 | — |
| Barren Solution | 1465 | 85.0 | 2.59 | 18.4 | 11 | NA | 421 | — |
| Feed Resin | 13.0 | 1.10 | 0.00 | 2.72 | 1.0 | 3.88 | 7.03 | — |
| Loaded Resin (cal.) | 12.8 | 11.9 | 1.85 | 5.67 | 3.8 | NA | 2.53 | — |
| Loaded Resin (assay) | 12.8 | 10.7 | 2.35 | 6.30 | 2.7 | 1.33 | NA | 2.41 |
| IX-3B | | | | | | | | |
| Feed Solution | 1950 | 422 | 60.5 | 111 | 7.2 | NA | 280 | — |
| Barren Solution | 1950 | 143 | 4.92 | 35.0 | 9.4 | NA | 405 | — |
| Feed Resin | 13.0 | 1.10 | 0.00 | 2.72 | 1.0 | 3.88 | 7.03 | — |
| Loaded Resin (cal.) | 12.8 | 12.8 | 2.34 | 5.91 | 3.8 | NA | 1.78 | — |
| Loaded Resin (assay) | 12.3 | 10.6 | 2.72 | 6.23 | 2.5 | 0.88 | NA | 1.60 |
| IX-3C | | | | | | | | |
| Feed Solution | 2440 | 422 | 60.5 | 111 | 7.2 | NA | 280 | — |
| Barren Solution | 2440 | 126 | 8.79 | 51.0 | 5.4 | NA | 399 | — |
| Feed Resin | 13.0 | 1.10 | 0.00 | 2.72 | 1.0 | 3.88 | 7.03 | — |
| Loaded Resin (cal.) | 12.8 | 16.4 | 2.66 | 5.81 | 5.1 | NA | 0.90 | — |
| Loaded Resin (assay) | 12.8 | 10.4 | 3.04 | 5.78 | 2.4 | 2.32 | NA | 4.21 |

| | | | | | |
|---|---|---|---|---|---|
| Resin for CN analysis | A | 2.1 mL | analysis | 80.70 mg CN | 38.43 mg/mL |
| Resin dried for Cu, S(T) | | 8 mL | weight | 2.87 g | 0.36 g/mL |
| Resin for CN analysis | B | 2.1 mL | analysis | 77.00 mg CN | 38.50 mg/mL |
| Resin dried for Cu, S(T) | | 8 mL | weight | 2.90 g | 0.36 g/mL |
| Resin for CN analysis | C | 2.1 mL | analysis | 77.00 mg CN | 38.50 mg/mL |
| Resin dried for Cu, S(T) | | 8 mL | weight | 2.96 g | 0.37 g/mL |

NA: not analyzed

| | |
|---|---|
| | Project 4424-116 Test IX-4A to C |
| Purpose: | To conduct resin loading tests using stripped resin from Test IX-4 |
| Procedure: | The synthetic solution (Feed IX-7) containing approximately |
| | 110 mg/L Cu |
| | 60 mg/L Zn |
| | 410 mg/L CN |
| | 300 mg/L SCN |
| | 9.1 CN:Cu mole ratio |
| | prepared in Test 3A-C was used in this test. |
| | Resin adsorption was carried out by contacting the stripped resin with |
| | the solution, at three solution-to-resin ratios, in a bottle placed on a |

-continued

Project 4424-116 Test IX-4A to C

| | |
|---|---|
| | roller for 24 hours. The solution was maintained at approximately pH 10.5 during loading. The resin was recovered and washed with water. The resin was analyzed for Cu (by XRF), $S_T$ and $CN_T$. A sample of the barren solution was analyzed for Cu, Zn, SCN and $CN_T$. |
| Loading Solution: | Feed IX-7 solution |
| Resin: | Stripped resin from Test IX-4 |
| Temperature: | Ambient |
| pH: | 10.5–11 with NaOH |
| Method: | Bottle on roller |

Analysis (mg/L. %)

| Test | Volume mL | CN(T) | Zn | Cu | CN:Cu M/M | S(T) | SCN | SCN cal. from S |
|---|---|---|---|---|---|---|---|---|
| IX-4A | | | | | | | | |
| Feed Solution | 1465 | 422 | 60.5 | 111 | 7.2 | NA | 280 | — |
| Barren Solution | 1465 | 64.0 | 7.40 | 25.9 | 4.9 | NA | 345 | — |
| Feed Resin | 13.0 | 1.80 | 0.00 | 4.36 | 1.0 | 2.76 | 5.00 | — |
| Loaded Resin (cal.) | 12.8 | 12.9 | 1.65 | 7.01 | 3.6 | NA | 2.98 | — |
| Loaded Resin(assay) | 12.8 | 6.61 | 1.72 | 6.70 | 1.4 | 2.13 | NA | 3.86 |
| IX-4B | | | | | | | | |
| Feed Solution | 1950 | 422 | 60.5 | 111 | 7.2 | NA | 280 | — |
| Barren Solution | 1950 | 136 | 8.41 | 49.3 | 6.1 | NA | 325 | — |
| Feed Resin | 13.0 | 1.80 | 0.00 | 4.36 | 1.0 | 2.76 | 5.00 | — |
| Loaded Resin (cal.) | 12.8 | 13.6 | 2.14 | 6.90 | 3.6 | NA | 3.15 | — |
| Loaded Resin(assay) | 12.8 | 7.70 | 2.27 | 6.47 | 1.5 | 1.51 | NA | 2.74 |
| IX-4C | | | | | | | | |
| Feed Solution | 2440 | 422 | 60.5 | 111 | 7.2 | NA | 280 | — |
| Barren Solution | 2440 | 181 | 11.7 | 69.2 | 5.7 | NA | 304 | — |
| Feed Resin | 13.0 | 1.80 | 0.00 | 4.36 | 1.0 | 2.76 | 5.00 | — |
| Loaded Resin (cal.) | 12.8 | 14.1 | 2.49 | 6.49 | 3.8 | NA | 3.78 | — |
| Loaded Resin(assay) | 12.8 | 7.22 | 2.60 | 6.19 | 1.2 | 1.26 | NA | 2.28 |

| | | | | | | |
|---|---|---|---|---|---|---|
| Resin for CN analysis | A | 2.1 mL | analysis | 51 mg CN | | 24.29 mg/mL |
| Resin dried for Cu, S(T) | | 8 mL | weight | 2.94 g | | 0.37 g/mL |
| Resin for CN analysis | B | 2.1 mL | analysis | 57 mg CN | | 28.50 mg/mL |
| Resin dried for Cu, S(T) | | 8 mL | weight | 2.96 g | | 0.37 g/mL |
| Resin for CN analysis | C | 2.1 mL | analysis | 54 mg CN | | 27.00 mg/mL |
| Resin dried for Cu, S(T) | | 8 mL | weight | 2.99 g | | 0.37 g/mL |

NA: not analyzed

Project 4424-116 Test IX-5A to C

| | |
|---|---|
| Purpose: | To conduct resin loading tests using stripped resin from Test IX-5 |
| Procedure: | The synthetic solution (Feed IX-7) containing approximately<br>110 mg/L Cu<br>60 mg/L Zn<br>410 mg/L CN<br>300 mg/L SCN<br>9.1 CN:Cu mole ratio<br>prepared in Test 3A-C was used in this test.<br>Resin adsorption was carried out by contacting the stripped resin with the solution, at three solution-to-resin ratios, in a bottle placed on a roller for 24 hours. The solution was maintained at approximately pH 10.5 during loading. The resin was recovered and washed with water. The resin was analyzed for Cu (by XRF), $S_T$ and $CN_T$.<br>A sample of the barren solution was analyzed for Cu, Zn, SCN and $CN_T$. |
| Loading Solution: | Feed IX-7 solution |
| Resin: | Stripped resin from Test IX-5 |
| Temperature: | Ambient |
| pH: | 10.5–11 with NaOH |
| Method: | Bottle on roller |

Analysis (mg/L. %)

| Test | Volume mL | CN(T) | Zn | Cu | CN:Cu M/M | S(T) | SCN | SCN cal. from S |
|---|---|---|---|---|---|---|---|---|
| IX-5A | | | | | | | | |
| Feed Solution | 1465 | 422 | 60.5 | 111 | 7.2 | NA | 280 | — |

-continued

| Project 4424-116 Test IX-5A to C | | | | | | | | |
|---|---|---|---|---|---|---|---|---|
| Barren Solution | 1465 | 31.6 | 2.66 | 24.3 | 2.8 | NA | 290 | — |
| Feed Resin | 13.0 | 3.70 | 0.00 | 9.02 | 1.0 | 1.24 | 2.25 | — |
| Loaded Resin (cal.) | 12.6 | 15.2 | 1.70 | 11.6 | 2.6 | NA | 1.95 | — |
| Loaded Resin(assay) | 12.6 | 8.67 | 1.60 | 11.2 | 1.3 | 2.10 | NA | 3.81 |
| IX-5B | | | | | | | | |
| Feed Solution | 1950 | 422 | 60.5 | 111 | 7.2 | NA | 280 | — |
| Barren Solution | 1950 | 160 | 12.6 | 104 | 3.3 | NA | 354 | — |
| Feed Resin | 13.0 | 3.70 | 0.00 | 9.02 | 1.0 | 1.24 | 2.25 | — |
| Loaded Resin (cal.) | 12.6 | 14.1 | 1.90 | 9.30 | 2.9 | NA | −0.69 | — |
| Loaded Resin(assay) | 12.6 | 10.1 | 2.00 | 9.87 | 1.7 | 1.01 | NA | 1.83 |
| IX-5C | | | | | | | | |
| Feed Solution | 2440 | 422 | 60.5 | 111 | 7.2 | NA | 280 | — |
| Barren Solution | 2440 | 202 | 24.9 | 112 | 3.5 | NA | 284 | — |
| Feed Resin | 13.0 | 3.70 | 0.00 | 9.02 | 1.0 | 1.24 | 2.25 | — |
| Loaded Resin (cal.) | 12.6 | 14.8 | 1.80 | 8.97 | 3.3 | NA | 2.05 | — |
| Loaded Resin(assay) | 12.6 | 6.78 | 2.02 | 9.00 | 1.0 | 0.83 | NA | 1.50 |
| Resin for CN analysis | A | 2.1 mL | analysis | | 71.9 mg CN | | 34.24 mg/mL | |
| Resin dried for Cu, S(T) | | 8 mL | weight | | 3.16 g | | 0.40 g/mL | |
| Resin for CN analysis | B | 2.1 mL | analysis | | 78.5 mg CN | | 39.25 mg/mL | |
| Resin dried for Cu, S(T) | | 8 mL | weight | | 3.12 g | | 0.39 g/mL | |
| Resin for CN analysis | C | 2.1 mL | analysis | | 52 mg CN | | 26.00 mg/mL | |
| Resin dried for Cu, S(T) | | 8 mL | weight | | 3.07 g | | 0.38 g/mL | |

NA: not analyzed

| Project 4424-116 Test IX-6A to C | |
|---|---|
| Purpose: | To conduct resin loading tests using stripped resin from Test IX-6 |
| Procedure: | The synthetic solution (Feed IX-7) containing approximately |
| | 110 mg/L Cu |
| | 60 mg/L Zn |
| | 410 mg/L CN |
| | 300 mg/L SCN |
| | 9.1 CN:Cu mole ratio |
| | prepared in Test 3A-C was used in this test. |
| | Resin adsorption was carried out by contacting the stripped resin with the solution, at three solution-to-resin ratios, in a bottle placed on a roller for 24 hours. The solution was maintained at approximately pH 10.5 during loading. The resin was recovered and washed with water. The resin was analyzed for Cu (by XRF), $S_T$ and $CN_T$. A sample of the barren solution was analyzed for Cu, Zn, SCN and $CN_T$. |
| Loading Solution: | Feed IX-7 solution |
| Resin: | Stripped resin from Test IX-6 |
| Temperature: | Ambient |
| pH: | 10.5–11 with NaOH |
| Method: | Bottle on roller |

| Test | Volume mL | Analysis (mg/L, %) | | | | | | |
|---|---|---|---|---|---|---|---|---|
| | | CN(T) | Zn | Cu | CN:Cu M/M | S(T) | SCN | SCN cal. from S |
| IX-6A | | | | | | | | |
| Feed Solution | 1465 | 422 | 60.5 | 111 | 7.2 | NA | 280 | — |
| Barren Solution | 1465 | 112 | 2.20 | 94.0 | 2.8 | NA | 312 | — |
| Feed Resin | 13.0 | 5.80 | 0.00 | 14.2 | 1.0 | 1.4 | 5.00 | — |
| Loaded Resin (cal.) | 12.8 | 14.1 | 1.56 | 14.7 | 1.9 | NA | 4.15 | — |
| Loaded Resin(assay) | 12.8 | 7.5 | 1.05 | 16.2 | 0.9 | 1.57 | NA | 2.85 |
| IX-6B | | | | | | | | |
| Feed Solution | 1950 | 422 | 60.5 | 111 | 7.2 | NA | 280 | — |
| Barren Solution | 1950 | 177 | 10.2 | 142 | 2.8 | NA | 313 | — |
| Feed Resin | 13.0 | 5.80 | 0.00 | 14.2 | 1.0 | NA | 5.00 | — |
| Loaded Resin (cal.) | 12.9 | 14.5 | 1.79 | 13.1 | 2.2 | NA | 3.82 | — |
| Loaded Resin(assay) | 12.9 | 8.6 | 1.64 | 15.0 | 1.0 | 0.92 | NA | 1.67 |
| IX-6C | | | | | | | | |
| Feed Solution | 2440 | 422 | 60.5 | 111 | 7.2 | NA | 280 | — |
| Barren Solution | 2440 | 154 | 6.21 | 118 | 3.0 | NA | 310 | — |
| Feed Resin | 13.0 | 5.80 | 0.00 | 14.2 | 1.0 | NA | 5.00 | — |
| Loaded Resin (cal.) | 12.9 | 17.9 | 2.46 | 13.9 | 2.5 | NA | 3.64 | — |

-continued

| Project 4424-116 Test IX-6A to C | | | | | | | |
|---|---|---|---|---|---|---|---|
| Loaded Resin(assay) | 12.9 | 9.34 | 2.59 | 15.0 | 0.8 | 1.15 | NA | 2.08 |

| | | | | | | |
|---|---|---|---|---|---|---|
| Resin for CN analysis | A | 2.1 mL | analysis | 67.50 mg CN | | 32.14 mg/mL |
| Resin dried for Cu, S(T) | | 8 mL | weight | 3.43 g | | 0.43 g/mL |
| Resin for CN analysis | B | 2.1 mL | analysis | 72.60 mg CN | | 36.30 mg/mL |
| Resin dried for Cu, S(T) | | 8 mL | weight | 3.39 g | | 0.42 g/mL |
| Resin for CN analysis | C | 2.1 mL | analysis | 78 mg CN | | 39.00 mg/mL |
| Resin dried for Cu, S(T) | | 8 mL | weight | 3.34 g | | 0.42 g/mL |

NA: not analyzed

EXAMPLE 3

| Project 05630-001 Test IX-2 | |
|---|---|
| Purpose: | Batch regeneration at pH 1 pH 1.5 |
| Procedure: | The resin (50 mL) was placed in a kettle equipped with a pH probe. |
| | Deionized water (250 mL) was added. |
| | Mixing was provided with an over head mixer. |
| | The slurry was adjusted to pH 1.5 with dilute H2SO4 and maintained at this pH for 4 hours. |
| | Samples of resin slurry were taken at 1, 2 and 4 hours. |
| | The solution was analyzed for Cu. |
| | The resin was assayed for CN and Cu. |
| | After 6 hours, the resin was recovered for analysis of CN and Cu. |
| | The solution was analyzed for Cu. |
| Resin: | 50 mL "eluted" resin prepared in Test IX-1 |
| Strip Solution: | 250 mL deionized water plus approximately 25 mL water in resin bed |
| pH: | 1.5 with H2SO4 20% |
| Temperature: | Ambient |
| Method: | Agitated kettle |

| | Sol. | Resin | Resin | | H2SO4 Added | | Solution Anal. | | Resin Analysis (mg/L, %) | | | | |
|---|---|---|---|---|---|---|---|---|---|---|---|---|---|
| Sample | Vol. mL | Vol. mL | Mass g | pH | 20% w/w g | Cumu. % Stoic* | CN(F) mg/L** | Cu mg/L | CN | Cu | CN:Cu M/M | S(T) | SCN |
| Feed resin | | 50 | 19.8 | — | — | — | — | — | 11.9 | 13.0 | 2.2 | 1.97 | 3.57 |
| Solution | 250 | | | | | | — | — | | | | | |
| 1-hour | | 14.8 | 5.89 | 1.5 | 10.8 | 88 | 1940 | 0.62 | 7.16 | 12.2 | 1.4 | NA | — |
| 2-hour | | 14.5 | 5.79 | 1.5 | 0.10 | 88 | 1950 | 0.52 | 7.14 | 12.3 | 1.4 | NA | — |
| 4-hour | | 14.8 | 5.91 | 1.5 | | | 1770 | 0.80 | 7.14 | 12.5 | 1.4 | NA | — |
| 6-hour | | 9.8 | 3.89 | 1.5 | | | 1110 | 1.23 | 5.79 | 12.4 | 1.1 | NA | — |
| Total | | 53.9 | 21.5 | | | | | | | | | | |

*Based on conversion of loaded copper cyanide to CuCN.
**Excluded losses as HCN during test
NA: not analyzed

| Eluted Resin | 1 h | 2 mL | 57 mg CN(T) | |
| | | 10 mL, wt: | 3.98 g | 0.398 g/mL |
| | 2 h | 2 mL | 57 mg CN(T) | |
| | | 10 mL, wt: | 3.99 g | 0.399 g/mL |
| | 4 h | 2 mL | 57 mg CN(T) | |
| | | 10 mL, wt: | 3.99 g | 0.399 g/mL |
| | 6 h | 2 mL | 46 mg CN(T) | |
| | | 7.7 mL, wt: | 3.06 g | 0.397 g/mL |

| Project 05630-001 Test IX-3 | |
|---|---|
| Purpose: | Batch regeneration of resin using 100% of the stoichiometric requirement of H2SO4 for converting copper cyanide on resin to CuCN. |
| Procedure: | The resin (60 mL) was placed in a kettle equipped with a pH probe. |
| | Deionized water (300 mL) was added. |
| | Mixing was provided with an over head mixer. |
| | Concentrated H2SO4 was added. |
| | Samples of resin slurry were taken at 1, 2 and 4 hours. |
| | The solution was analyzed for Cu. |
| | The resin was assayed for CN and Cu. |
| | After 6 hours, the resin was recovered for analysis of CN and Cu. |
| | The solution was analyzed for Cu. |
| Resin: | 60 mL "eluted" resin prepared in Test IX-1 |

Project 05630-001 Test IX-3

| | | |
|---|---|---|
| Strip Solution: | 300 mL deionized water plus approximately 30 mL water in resin bed | |
| H2SO4: | 3.35 g 96.5% or ~100% of the stoic. requirement for converting copper cyanide to CuCN | |
| Temperature: | Ambient | |
| Method: | Agitated kettle | |

| Sample | Sol. Vol. mL | Resin Vol. mL | Resin Mass g | pH | H2SO4 Added 96.5% g | H2SO4 Added % Stoic* | Solution Anal. CN(F) mg/L** | Solution Anal. Cu mg/L | Resin Analysis CN | Resin Analysis Cu | Resin Analysis CN:Cu M/M | Resin Analysis S(T) | Resin Analysis SCN |
|---|---|---|---|---|---|---|---|---|---|---|---|---|---|
| Feed resin | | 60 | 23.8 | — | 0 | — | — | — | 11.9 | 13.0 | 2.2 | 1.97 | 3.57 |
| Solution | 300 | | | | | | — | — | | | | | |
| 1-hour | | 14.0 | 5.60 | | 3.35 | 110 | 1238 | 1.05 | 5.59 | 12.0 | 1.1 | NA | — |
| 2-hour | | 14.0 | 5.60 | | | | 2211 | 0.95 | 6.89 | 12.2 | 1.4 | NA | — |
| 4-hour | | 14.0 | 5.60 | | | | 1663 | 1.74 | 6.73 | 11.9 | 1.4 | NA | — |
| 6-hour | | 22.6 | 9.04 | | | | 1220 | 2.89 | 5.69 | 12.0 | 1.2 | NA | — |
| Total | | 64.6 | 25.8 | | | | | | | | | | |

*Based on conversion of loaded copper cyanide to CuCN.
**Excluded losses as HCN during test
NA: not analyzed

| Eluted Resin | | | | |
|---|---|---|---|---|
| | 1 h | 2 mL | 44.7 mg CN(T) | |
| | | 10 mL, wt: | 4 g | 0.400 g/mL |
| | 2 h | 2.1 mL | 57.9 mg CN(T) | |
| | | 10 mL, wt: | 4 g | 0.400 g/mL |
| | 4 h | 2.1 mL | 56.5 mg CN(T) | |
| | | 10 mL, wt: | 4 g | 0.400 g/mL |
| | 6 h | 2 mL | 45.5 mg CN(T) | |
| | | 10 mL, wt: | 4 g | 0.400 g/mL |

Project 05630-001 Test IX-4

| | |
|---|---|
| Purpose: | Batch regeneration of resin using 200% of the stoichiometric requirement of H2SO4 for converting copper cyanide on resin to CuCN. |
| Procedure: | The resin (60 mL) was placed in a kettle equipped with a pH probe. |
| | Deionized water (300 mL) was added. |
| | Mixing was provided with an over head mixer. |
| | Concentrated H2SO4 was added. |
| | Samples of resin slurry were taken at 1, 2 and 4 hours. |
| | The solution was analyzed for Cu. |
| | The resin was assayed for CN and Cu. |
| | After 6 hours, the resin was recovered for analysis of CN and Cu. |
| | The solution was analyzed for Cu. |
| Resin: | 60 mL "eluted" resin prepared in Test IX-1 |
| Strip Solution: | 300 mL deionized water plus approximately 30 mL water in resin bed |
| H2SO4: | 6.70 g 97% or ~200% of the stoic. requirement for converting copper cyanide to CuCN |
| Temperature: | Ambient |
| Method: | Agitated kettle |

| Sample | Sol. Vol. mL | Resin Vol. mL | Resin Mass g | pH | H2SO4 Added 96.5% g | H2SO4 Added % Stoic* | Solution Anal. CN(F) mg/L** | Solution Anal. Cu mg/L | Resin Analysis CN | Resin Analysis Cu | Resin Analysis CN:Cu M/M | Resin Analysis S(T) | Resin Analysis SCN |
|---|---|---|---|---|---|---|---|---|---|---|---|---|---|
| Feed resin | | 60 | 23.8 | — | 0 | — | — | — | 11.9 | 13.0 | 2.2 | 1.97 | 3.57 |
| Solution | 300 | | | | | | — | — | | | | | |
| 1-hour | | 14.0 | 5.74 | | 6.70 | 220 | 1256 | 8.83 | 6.44 | 11.4 | 1.4 | NA | — |
| 2-hour | | 14.0 | 5.74 | | | | 2087 | 13.6 | 5.63 | 11.4 | 1.2 | NA | — |
| 4-hour | | 14.0 | 5.74 | | | | 1397 | 23.5 | 5.41 | 11.5 | 1.1 | NA | — |
| 6-hour | | 23.4 | 9.59 | | | | 637 | 36.7 | 4.70 | 11.3 | 1.0 | NA | — |
| Total | | 65.4 | 26.8 | | | | | | | | | | |

*Based on conversion of loaded copper cyanide to CuCN.
**Excluded losses as HCN during test
NA: not analyzed

| Eluted Resin | | | | |
|---|---|---|---|---|
| | 1 h | 2 mL | 52.8 mg CN(T) | |
| | | 10 mL, wt: | 4.1 g | 0.410 g/mL |
| | 2 h | 2 mL | 46.2 mg CN(T) | |
| | | 10 mL, wt: | 4.1 g | 0.410 g/mL |
| | 4 h | 2 mL | 44.4 mg CN(T) | |
| | | 10 mL, wt: | 4.1 g | 0.410 g/mL |
| | 6 h | 2 mL | 38.5 mg CN(T) | |
| | | 10 mL, wt: | 4.1 g | 0.410 g/mL |

Project 05630-001 Test IX-5

| | |
|---|---|
| Purpose: | Continuous regeneration of the "eluted" resin prepared in Test IX-1 using 100% of the stoichiometric requirement of $H_2SO_4$ for converting copper cyanide on resin to CuCN. |
| Procedure: | |
| 1. | Five 1-cm I.D. glass columns were labelled A, B, C, D and E. |
| 2. | Each column was loaded with 20 mL of resin from Test IX-1. The water was drained. |
| 3. | Three columns A, B and C were connected in series for regeneration. |
| 4. | Deionized water (DIW) was pumped upflow through the circuit to adjust the flowrate to 0.67 mL/min (2 BV/h). The water was then drained from all columns. |
| 5. | The regenerant for the first 2 hours was prepared by diluting 2.79 g $H_2SO_4$ 96.5% in DIW to 100 mL. |
| 6. | A separate circuit was set up for washing of the regenerated resin column (one each time) with DIW at 0.67 mL/min (2 BV/h). |
| 7. | The regeneration pump was turned on to start the test. |
| 8. | The acid solution after passing through the circuit was collected in a covered 50-mL grad cylinder. The graduated cylinder contained some NaOH pellets to adjust the solution to pH >11. |
| 9. | At 1 h, the pump was turned off. The regenerate collected was placed in a cup (Regenerate A). |
| 10. | Column A filled with acid solution was moved over to washing. |
| 11. | DIW (40 mL) was passed up flow through Column A. The effluent was collected in a 50-mL graduated cylinder. The cylinder was well covered to minimize loss of HCN. |
| 12. | A new resin column (Column D) was added to the regeneration circuit (downstream of Column C). |
| 13. | The acid solution was pumped to Column B to continue the regeneration. |
| | The effluent was collected as in No. 8 above. |
| 14. | At 2 h, the pump was turned off. The regenerate collected was placed in a cup (Regenerate B). |
| 15. | 1.12 g $H_2SO_4$ 96.5% was added to the 40 mL wash collected from washing of Column A. This recycle solution was used for regeneration of Column C |
| 16. | The water in Column A was drained into a cup containing some NaOH (Wash drain A). |
| 17. | The resin was recovered. The volume was measured then saved in a cup (Resin A) |
| 18. | Column B filled with acid solution was moved over to washing. |
| 19. | DIW (40 mL) was passed up flow through Column B. The effluent was collected as in No. 11 above. |
| 20. | A new resin column (Column E) was added to the regeneration circuit (downstream of Column D). |
| 21. | The recycle solution from No. 15 was pumped through Column C to continue the regeneration. |
| 22. | The empty column from No. 17 was filled with 20 mL of new resin and called Column F. |
| 23. | The process continued for a total of 8 hours. The last three columns in the circuit were H, I and J. |
| 24. | The solution in each column (H, I and J) was separately drained. The volume and pH were measured. Each drain solution was adjusted to pH >11 and analyzed for CN(T) and Cu. |
| 25. | Each final circuit resin was washed with 80 mL water. The wash and drain were combined and adjusted to pH >11. The volume was measured and analyzed for Cu and CN(T). |
| 26. | Each final resin was recovered. The volume was measured then saved in a cup (Resins H, I and J) |
| 27. | The effluents from regeneration of Columns D and G, and from the drain solutions from washing of Columns A, D and G were analyzed for CN(T) and Cu. |
| Feed Resin: | 20 mL "eluted" resin prepared in Test IX-1 per coulmn |
| No. of Columns | 3 connected in series in regeneration circuit<br>1 regenerated resin column in wash circuit |
| H2SO4: | 1.12 96.5% or ~100% stoic. requirement for converting copper cyanide to CuCN<br>The regenerants, 40 mL each (2 BV), were prepared in DIW for first two columns A and B, and in effluents from washing of regenerated resin for Columns C to H. |
| Retention Time: | 1 h for regeneration<br>1 h for washing of regenerated resin |

| Regeneration Effluent | Drain from Regen. Columns | Effluent from Washing | Drain from Washed Column | Resin Analysis |
|---|---|---|---|---|

-continued

| Time | Resin Vol. | Column | pH | CN_T mg/L | Cu mg/L | Vol. mL | pH | CN_T mg/L | Cu mg/L | Vol. mL | pH | CN_T mg/L | Cu mg/L | Vol. mL | pH | CN_T mg/L | Cu mg/L | Vol. mL | Wt. g | CN_T % | Cu % | CN:Cu M/M | mL | mg CN | g/10 mL | g/mL |
|---|---|---|---|---|---|---|---|---|---|---|---|---|---|---|---|---|---|---|---|---|---|---|---|---|---|---|
| h | mL |  |  |  |  |  |  |  |  |  |  |  |  |  |  |  |  |  |  |  |  |  |  |  |  | Resin assay |  |
| 0 | — | — | — | — | — | — | — | — | — | — | — | — | — | — | — | — | — | — | 7.91 | 11.9 | 13.0 | 2.2 | — | — | — | — |
| 1 | 0 | A | — | — | — | — | — | — | — | — | — | — | — | — | — | — | — | * | 8.32 | 6.49 | 11.3 | 1.4 | 2 | 52.4 | 4.04 | 0.40 |
| 2 | 15 | B | — | 24.0 | 1.2 | — | — | — | — | — | — | — | — | — | — | — | — | * | — | — | — | — | — | — | — | — |
| 3 | 21 | C | — | — | — | — | — | — | — | — | — | — | — | — | — | — | — | * | — | — | — | — | — | — | — | — |
| 4 | 19 | D | — | — | — | — | — | 24.0 | 1.2 | — | — | — | 3.6 | — | — | — | — | * | 8.63 | 5.40 | 11.3 | 1.2 | 2 | 44.4 | 4.11 | 0.41 |
| 5 | 21 | E | — | — | — | — | — | — | — | — | — | — | — | — | — | — | — | * | — | — | — | — | — | — | — | — |
| 6 | 21 | F | — | — | — | — | — | — | — | — | — | — | — | — | — | — | — | — | — | — | — | — | — | — | — | — |
| 7 | 19 | G | — | 3.5 | 1.4 | 12 | — | — | — | — | — | — | 3.0 | 13 | 1.0 | 14900 | 3.1 | 40 | 8.38 | 4.95 | 11.2 | 1.1 | 2 | 40.7 | 4.11 | 0.41 |
| 8 | 20 | H | — | 4.7 | 1.4 | 14 | 0.7 | 14800 | 3.5 | 12 | — | 6400 | 2.6 | 13 | — | — | — | — | 8.29 | 4.22 | 11.0 | 0.9 | 2 | 34.5 | 4.08 | 0.41 |
| 8 | — | I | — | — | — | — | 3.9 | 16100 | 2.9 | 14 | 2.0 | 7300 | 0.6 | 80^ | — | — | — | — | 7.83 | 8.26 | 12.2 | 1.7 | 2 | 66 | 4.00 | 0.40 |
| 8 | — | J | — | — | — | 10 | 5.3 | 3200 | 2.4 | 10 | 3.9 | 368 | 0.5 | 80^ | 5.6 | — | — | — | 7.77 | 8.89 | 12.3 | 1.8 | 2 | 70.8 | 3.98 | 0.40 |

Feed resin: 20 mL, IX-1 resin, 3 columns connected in series, using ~110% stoichiometric requirement of $H_2SO_4$

*$H_2SO_4$ added to wash effluent before reuse in regeneration of next column of resin.

^At 8 h, each resin column in circuit was washed with 80 mL deionized water. Wash and drain were combined.

CN(F) Titration    NO CN(F) found in Regen Effluents B, C, D, G. Analyze for CN(T) instead.

Wash collected from Column G had brown colour upon adjusting pH to <11

| Time | Resin Column | Regenerate | | | | Wash/Drain Solution | | | |
|---|---|---|---|---|---|---|---|---|---|
| | | Aliquot | AgNO3 | | CN(F) | Aliquot | AgNO3 | | CN(F) |
| | | | Start | End | | | Start | End | |
| h | | mL | | | mg/L | mL | | | mg/L |
| 1 | A | | | | | | | | Drain |
| 2 | B | | | | | | | | Drain |
| 3 | C | | | | | | | | Drain |
| 4 | D | | | | | | | | Drain |
| 5 | E | | | | | | | | Drain |
| 6 | F | | | | | | | | Drain |
| 7 | G | | | | | | | | Drain |
| 8 | G | | | | | | | | Wash |
| 8 | H | | | | | | | | W + D |
| 8 | I | | | | | | | | W + D |
| 8 | J | | | | | | | | W + D |

| Project 05630-001 Test IX-6 | |
|---|---|
| Purpose: | Bulk batch regeneration of resin using ~100% of the stoichiometric requirement of H2SO4 for converting copper cyanide on resin to CuCN. |
| Procedure: | The resin (400 mL, excess water removed) was placed in a kettle equipped with a pH probe. Deionized water (1 L) was added. Mixing was provided with air drawn by vacuum through 2 scrubbers connected in series. Concentrated H2SO4 was added. The pH was recorded hourly. Samples of resin slurry were taken at 8 and 24 hours. The solution was adjusted to pH >11 analyzed for CN(F) and Cu. The resin was assayed for CN and Cu (by XRF). The solutions from the 2 scrubbers were titrate for CN(F) at 8 and 24 hours. After the test, the resin was recovered, washed and the volume measured. |
| Resin: | 400 mL "eluted" resin prepared in Test IX-1 (the remainder ~100 mL was saved) |
| Strip Solution: | 1000 mL deionized water plus approximately 200 mL water in resin bed |
| H2SO4 | 22.3 g 96.5% or 110% the stoic. requirement for converting copper cyanide to CuCN |
| Temperature: | Ambient |
| Method: | Air-agitated kettle |
| Air flowrate: | ~8 L/min |
| Scrubbers: | 2 × 2 L, each contained 1 L of 5% NaOH |

| Sample | Resin Sol'n mL | Resin Mass g | pH | Acid Solution CN(F) mg/L | Acid Solution Cu mg/L | CN Scrubber #1 mg | CN Scrubber #2 mg | Resin Calculated CN % | Resin Calculated Cu % | Resin Calculated CN:Cu M/M | Resin Analysis (%) CN | Resin Analysis (%) Cu | Resin Analysis (%) CN:Cu M/M | S(T) |
|---|---|---|---|---|---|---|---|---|---|---|---|---|---|---|
| Feed Resin | 400 | 158 | | | | | | | | | 11.9 | 13.0 | 2.2 | 1.97 |
| Solution | 1200 | | 0.9 | | | | | | | | | | | |
| 1-hour | | | 1.4 | | | | | | | | | | | |
| 2-hour | | | 1.6 | | | | | | | | | | | |
| 3-hour | | | 1.6 | | | | | | | | | | | |
| 4-hour | | | 1.7 | | | | | | | | | | | |
| 5-hour | | | 1.7 | | | | | | | | | | | |
| 6-hour | | | 1.7 | | | | | | | | | | | |
| 7-hour | | | 1.7 | | | | | | | | | | | |
| 8-hour | 14 | 5.7 | 1.8 | 159 | 51.4 | 7641 | 223 | 6.15 | 11.7 | 1.3 | 4.32 | 11.1 | 1.0 | NA |
| 24-hour | 415 | 170 | 1.9 | 53 | 257 | 8224 | 271 | 5.86 | 11.6 | 1.2 | 5.33 | 11.0 | 1.2 | NA |
| Total | 429 | 175 | | | | | | | | | | | | |

NA: not analyzed

| Eluted Resin | 8 h | 2 mL | | 35.2 mg CN(T) | | |
| | | 10 mL, wt: | 4.07 g | | 0.407 g/mL | |
| | 24 h | 2 mL | | 43.6 mg CN(T) | | |
| | | 10 mL, wt: | 4.09 g | | 0.409 g/mL | |

Titrations

| | 10 ml | | 50 ml | | 10 ml | |
|---|---|---|---|---|---|---|
| scr 1 | 28.8 ml of AgNO3 at 8 hr | scr 2 | 4.2 ml of AgNO3 at 8 hr | acid | 0.60 ml of AgNO3 at 8 | |
| | 31 ml of AgNO3 at 24 hr | | 5.1 ml of AgNO3 at 24 hr | | 0.20 ml of AgNO3 at 2 | |

| Project 05630-001 Test IX-7 | |
|---|---|
| Loading Isotherm Purpose: | Loading isotherm using regenerated IX-6 resin with pulp from operating plant. |
| Procedure: | The feed resin was the regenerated resin from Test IX-6. Sufficient amounts of the plant solution and filter cake were removed from the freezer for thawing. The pulp was prepared by recombining the solution and the filter cake at the ratio of 1500 mL solution to 1270 g wet solids. (1270 g wet solids contained 250 mL solution.) NaCN at 0.75 g/L solution basis was added to raise the CN:Cu mole ration from approx. 2.6:1 to ~4:1. Resin loading was carried out by contacting the resin with the pulp at various solution-to-resin ratio, in a bottle placed on a roller overnight. The pulp was adjusted to pH 10.5–11 with lime. Following loading, the loaded resin was |

-continued

Project 05630-001 Test IX-7

|  |  |
|---|---|
| | recovered. |
| | A loaded resin sample (10 mL) was submitted for analysis of Au, |
| | Cu (by XRF), and $CN_T$. |
| | A solution sample was submitted for analysis of $CN_T$, |
| | SCN, Au and Cu. |
| Feed: | Reconstituted pulp (1500 mL solution to 1270 g |
| | wet filter cake) |
| | The pulp contained 1750 mL solution per |
| | 1020 g solids. |
| | NaCN at 0.75 g/L solution basis was added to raise CN:Cu mole ratio from |
| | ~2.6:1 to ~4:1. |
| Resin: | IX-6 containing 11% Cu, 5.33% CN.   Method:   Bottle on roller. |

| | | | Solution | | Analysis (mg/L, %, g/t) | | | | | Resin Calculated (%, g/t) | | | | |
|---|---|---|---|---|---|---|---|---|---|---|---|---|---|---|
| Test/Product | Volume mL | Mass g | to Resin Ratio | CN | Cu | CN:Cu M/M | Au | SCN | CN | Cu | CN:Cu M/M | Au | SCN |

7A

| | | | | | | | | | | | | | |
|---|---|---|---|---|---|---|---|---|---|---|---|---|---|
| Feed resin | 23 | 9.4 | 17.4 | 5.33 | 11.0 | 1.2 | 0.0 | 3.57 | 5.33 | 11.0 | 1.2 | 0.0 | 3.57 |
| Solution | 400 | | | ### | 644 | 4.1 | 0.28 | 640 | — | — | — | — | — |
| Barren | 400 | | | 9.8 | 10.4 | 2.3 | 0.06 | 400 | — | — | — | — | — |
| Loaded resin | 21.5 | 9.0 | | | 14.2 | 0.0 | | NA | 10.1 | 13.8 | 1.8 | 9.7 | 4.63 |

7B

| | | | | | | | | | | | | | |
|---|---|---|---|---|---|---|---|---|---|---|---|---|---|
| Feed resin | 16 | 6.5 | 25.0 | 5.33 | 11.0 | 1.2 | 0.0 | 3.57 | 5.33 | 11.0 | 1.2 | 0.0 | 3.57 |

EXAMPLE 4

Project 05630-001 Test IX-7

| | |
|---|---|
| Loading Isotherm | |
| Purpose: | Loading isotherm using regenerated IX-6 resin with pulp from operating plant. |
| Procedure: | The feed resin was the regenerated resin from Test IX-6. |
| | Sufficient amounts of the plant solution and filter cake were removed from the freezer for thawing. |
| | The pulp was prepared by recombining the solution and the filter cake at the ratio of |
| | 1500 mL solution to 1270 g wet solids. (1270 g wet solids contained 250 mL solution.) |
| | NaCN at 0.75 g/L solution basis was added to raise the CN:Cu mole ratio from approx. 2.6:1 to ~4:1. |
| | Resin loading was carried out by contacting the resin with the pulp at various solution-to-resin ratio, |
| | in a bottle placed on a roller overnight. |
| | The pulp was adjusted to pH 10.5–11 with lime. |
| | Following loading, the loaded resin was recovered. |
| | A loaded resin sample (10 mL) was submitted for analysis of Au, Cu (by XRF), and $CN_T$. |
| | A solution sample was submitted for analysis of $CN_T$, SCN, Au and Cu. |
| Feed: | Reconstituted pulp (1500 mL solution to 1270 g wet filter cake) |
| | The pulp contained 1750 mL solution per 1020 g solids. |
| | NaCN at 0.75 g/L solution basis was added to raise CN:Cu mole ratio from ~2.6:1 to ~4:1. |
| Resin: | IX-6 containing 11% Cu, 5.33% CN.   Method:   Bottle on roller. |

| | | | Solution | | Analysis (mg/L, %, g/t) | | | | | Resin Calculated (%, g/t) | | | | |
|---|---|---|---|---|---|---|---|---|---|---|---|---|---|---|
| Test/Product | Volume mL | Mass g | to Resin Ratio | CN | Cu | CN:Cu M/M | Au | SCN | CN | Cu | CN:Cu M/M | Au | SCN |

7A

| | | | | | | | | | | | | | |
|---|---|---|---|---|---|---|---|---|---|---|---|---|---|
| Feed resin | 23 | 9.4 | 17.4 | 5.33 | 11.0 | 1.2 | 0.0 | 3.57 | 5.33 | 11.0 | 1.2 | 0.0 | 3.57 |
| Solution | 400 | | | 1083* | 644 | 4.1 | 0.28 | 640 | — | — | — | — | — |
| Barren | 400 | | | 9.8 | 10.4 | 2.3 | 0.06 | 400 | — | — | — | — | — |
| Loaded resin | 21.5 | 9.0 | | | 14.2 | 0.0 | | NA | 10.1 | 13.8 | 1.8 | 9.7 | 4.63 |

7B

| | | | | | | | | | | | | | |
|---|---|---|---|---|---|---|---|---|---|---|---|---|---|
| Feed resin | 16 | 6.5 | 25.0 | 5.33 | 11.0 | 1.2 | 0.0 | 3.57 | 5.33 | 11.0 | 1.2 | 0.0 | 3.57 |
| Solution | 400 | | | 1083 | 644 | 4.1 | 0.28 | 640 | — | — | — | — | — |
| Barren | 400 | | | 76 | 66.9 | 2.8 | 0.04 | 640 | — | — | — | — | — |
| Loaded resin | 15 | 6.3 | | | 15.1 | 0.0 | | NA | 11.7 | 14.7 | 2.0 | 15.2 | 3.57 |

7C

| | | | | | | | | | | | | | |
|---|---|---|---|---|---|---|---|---|---|---|---|---|---|
| Feed resin | 14 | 5.7 | 33.6 | 5.33 | 11.0 | 1.2 | 0.0 | 3.57 | 5.33 | 11.0 | 1.2 | 0.0 | 3.57 |
| Solution | 470 | | | 1083 | 644 | 4.1 | 0.28 | 640 | — | — | — | — | — |
| Barren | 470 | | | 282 | 220 | 3.1 | 0.05 | 780 | — | — | — | — | — |

-continued

Project 05630-001 Test IX-7

| | | | | | | | | | | | | | | |
|---|---|---|---|---|---|---|---|---|---|---|---|---|---|---|
| Loaded resin 7D | 12.9 | 5.3 | | | 15.2 | 0.0 | | NA | 12.4 | 14.7 | 2.1 | 20.3 | 2.33 |
| Feed resin | 14 | 5.7 | 40.0 | 5.33 | 11.0 | 1.2 | 0.0 | 3.57 | 5.33 | 11.0 | 1.2 | 0.0 | 3.57 |
| Solution | 560 | | | 1083 | 644 | 4.1 | 0.28 | 640 | — | — | — | — | — |
| Barren | 560 | | | 384 | 310 | 3.0 | 0.04 | 810 | — | — | — | — | — |
| Loaded resin 7E | 13 | 5.3 | | | 14.8 | 0.0 | | NA | 12.7 | 14.5 | 2.1 | 25.2 | 1.79 |
| Feed resin | 14 | 5.7 | 50.0 | 5.33 | 11.0 | 1.2 | 0.0 | 3.57 | 5.33 | 11.0 | 1.2 | 0.0 | 3.57 |
| Solution | 700 | | | 1083 | 644 | 4.1 | 0.28 | 640 | — | — | — | — | — |
| Barren | 700 | | | 520 | 450 | 2.8 | 0.09 | 790 | — | — | — | — | — |
| Loaded resin | 13 | 5.3 | | | 14.0 | 0.0 | | NA | 12.7 | 13.5 | 2.3 | 25.0 | 1.60 |

NA: not analyzed
*Estimated, analysis pending.

| | | | | | |
|---|---|---|---|---|---|
| Loaded Resin A | 2 mL | | | mg CN(T) | |
| | 10 mL, wt: | 4.2 g | | | 0.42 g/mL |
| Loaded Resin B | 2 mL | | | mg CN(T) | |
| | 10 mL, wt: | 4.2 g | | | 0.42 g/mL |
| Loaded Resin C | 2 mL | | | mg CN(T) | |
| | 10 mL, wt: | 4.13 g | | | 0.41 g/mL |
| Loaded Resin D | 2 mL | | | mg CN(T) | |
| | 10 mL, wt: | 4.11 g | | | 0.41 g/mL |
| Loaded Resin E | 2 mL | | | mg CN(T) | |
| | 10 mL, wt: | 4.1 g | | | 0.41 g/mL |

EXAMPLE 5

Project 04116-001 Test IX-15

| | |
|---|---|
| Purpose: | Elution of copper from IX-6AR (~13% Cu, ~14% CN) resin using NaCN at 50% of the requirement for removing Cu and at a solution-to-resin ratio of 5-to-1, in a bottle. |
| Procedure: | The feed resin was placed in a small bottle. Water was drained/decanted. |
| | The eluant was prepared then added to the bottle. |
| | The bottle was capped and rolled overnight. |
| | The resin slurry was filtered by gravity on a cup. |
| | The resin was washed slowly with ~40 mL water. |
| | The filtrate and the wash were combined for analysis of $CN_T$ and Cu. |
| | The eluted resin was submitted for analysis of Cu and Zn by XRF. |
| Resin: | IX-6AR containing ~13% Cu (~53 g/L Cu), ~14% CN (57 g/L CN)   Volume: 10 mL |
| Eluant: | 4.34 g/L CN   Volume: 50 mL |
| | (0.43 g NaCN 95%) |
| Temperature: | 20–25° C.   Sol-to-Resin Ratio:  5-to-1 |
| Method: | Bottle on roller overnight |

| Sample | Volume mL | Mass g | CN * | Zn | Cu | CN:Cu M/M | S(T) | SCN | Cal. Resin (%) CN | Cu | SCN 51.6 g/L Cu | 49.5 g/L CN |
|---|---|---|---|---|---|---|---|---|---|---|---|---|
| Feed resin | 10 | 4.06 | 12.2 | 0.81 | 12.7 | 2.1 | 2.85 | | 12.2 | 12.7 | | |
| Eluant | 50 | | 4335 | — | — | — | — | — | — | — | | |
| Effluate & wash | 85 | | 2800 | NA | 2060 | 3.3 | NA | — | 11.6 | 8.05 | | |
| Eluted resin | 10 | | | | | | | | | | | |
| Calc. | 10 | 3.77 | 11.6 | | 8.05 | 3.2 | — | — | | | | |
| Assay | 10 | 3.77 | 11.2 | 0.78 | 9.87 | 2.5 | NA | — | | | | |

*Feed resin being reassayed for CN(T)
NA: not analyzed

| | | | | | | |
|---|---|---|---|---|---|---|
| Eluted Resin | 2 mL | | 84 mg CN(T) | | 10 mL resin | 4.06 g | |
| | 6 mL, wt: | 2.26 g | | 0.377 g/mL | 0.53 g Cu | 0.0083 M Cu |
| | | | | | | 0.0083 M CN needed |
| | | | | | | 0.216 g CN needed |
| | | | | | | 0.429 g NaCN 95% needed |
| | | | | | 15 mL resin | 6.09 g |
| | | | | | 0.79 g Cu | 0.0125 M Cu |
| | | | | | | 0.0125 M CN needed |
| | | | | | | 0.324 g CN needed |
| | | | | | | 0.64 g NaCN 95% needed |

| Project 04116-001 Test IX-16 | |
|---|---|
| Purpose: | Elution of copper from IX-6AR (~13% Cu, ~14% CN) resin using NaCN at 50% of the requirement for removing Cu and at a solution-to-resin ratio of 2.5-to-1, in a bottle. |
| Procedure: | The feed resin was placed in a small bottle. Water was drained/decanted. |
| | The eluant was prepared then added to the bottle. |
| | The bottle was capped and rolled overnight. |
| | The resin slurry was filtered by gravity on a cup. |
| | The resin was washed slowly with ~40 mL water. |
| | The filtrate and the wash were combined for analysis of $CN_T$ and Cu. |
| | The eluted resin was submitted for analysis of Cu and Zn by XRF. |
| Resin: | IX-6AR containing ~13% Cu (~53 g/L Cu), ~14% CN (57 g/L CN)  Volume: 10 mL |
| Eluant: | 8.67 g/L CN  Volume: 25 mL |
| | (0.43 g NaCN 95%) |
| Temperature: | 20–25° C.  Sol-to-Resin Ratio:  2.5-to-1 |
| Method: | Bottle on roller overnight |

| | | | Analysis (mg/L, %) | | | | | | | | Cal. Resin (%) | |
|---|---|---|---|---|---|---|---|---|---|---|---|---|
| | Volume | Mass | | | | CN:Cu | | | | | | |
| Sample | mL | g | * | Zn | Cu | M/M | S(T) | SCN | CN | Cu | SCN 51.6 g/L Cu | 49.5 g/L CN |
| Feed resin | 10 | 4.06 | 12.2 | 0.81 | 12.7 | 2.1 | 2.85 | | 12.2 | 12.7 | | |
| Eluant | 25 | | 8670 | — | — | — | — | — | — | — | | |
| Effluate & wash | 60 | | 3950 | NA | 2900 | 3.3 | NA | — | 11.7 | 8.12 | | |
| Eluted resin | 10 | | | | | | | | | | | |
| Calc. | 10 | 3.80 | 11.7 | | 8.12 | 3.1 | — | — | | | | |
| Assay | 10 | 3.80 | 10.8 | 0.77 | 9.77 | 2.4 | NA | — | | | | |

*Feed resin being reassayed for CN(T)
NA: not analyzed

| Eluted Resin | 2 mL | | 82 mg CN(T) | |
|---|---|---|---|---|
| | 6 mL, wt: | | 2.28 g | 0.380 g/mL |

| Project 04116-001 Test IX-17 | |
|---|---|
| Purpose: | Elution of copper from IX-6AR (~13% Cu, ~14% CN) resin using NaCN at 50% of the requirement for removing Cu and at a solution-to-resin ratio of 1-to-1, in a bottle. |
| Procedure: | The feed resin was placed in a small bottle. Water was drained/decanted. |
| | The eluant was prepared then added to the bottle. |
| | The bottle was capped and rolled overnight. |
| | The resin slurry was filtered by gravity on a cup. |
| | The resin was washed slowly with ~40 mL water. |
| | The filtrate and the wash were combined for analysis of $CN_T$ and Cu. |
| | The eluted resin was submitted for analysis of Cu and Zn by XRF. |
| Resin: | IX-6AR containing ~13% Cu (~53 g/L Cu), ~14% CN (57 g/L CN)  Volume: 10 mL |
| Eluant: | 21.68 g/L CN  Volume: 10 mL |
| | (0.43 g NaCN 95%) |
| Temperature: | 20–25° C.  Sol-to-Resin Ratio:  1-to-1 |
| Method: | Bottle on roller overnight |

| | | | Analysis (mg/L, %) | | | | | | | | Cal. Resin (%) | |
|---|---|---|---|---|---|---|---|---|---|---|---|---|
| | Volume | Mass | | | | CN:Cu | | | | | | |
| Sample | mL | g | * | Zn | Cu | M/M | S(T) | SCN | CN | Cu | SCN 51.6 g/L Cu | 49.5 g/L CN |
| Feed resin | 10 | 4.06 | 12.2 | 0.81 | 12.7 | 2.1 | 2.85 | | 12.2 | 12.7 | | |
| Eluant | 10 | | 21676 | — | — | — | — | — | — | — | | |
| Effluate & wash | 45 | | 5050 | NA | 3870 | 3.2 | NA | — | 11.9 | 8.14 | | |
| Eluted resin | 10 | | | | | | | | | | | |
| Calc. | 10 | 3.82 | 11.9 | | 8.14 | 3.2 | — | — | | | | |
| Assay | 10 | 3.82 | 11.4 | 0.74 | 9.44 | 2.6 | NA | — | | | | |

*Feed resin being reassayed for CN(T)
NA: not analyzed

| Eluted Resin | 2 mL | | 87 mg CN(T) | |
|---|---|---|---|---|
| | 6 mL, wt: | | 2.29 g | 0.382 g/mL |

| Project 04116-001 Test IX-18 | |
|---|---|
| Purpose: | Elution of copper from IX-6AR (~13% Cu, ~14% CN) resin using NaCN at 50% of the requirement for removing Cu and at a solution-to-resin ratio of 1-to-1, in a bottle. |
| Procedure: | The feed resin was placed in a small bottle. Water was drained/decanted. |
| | The eluant was prepared then added to the bottle. |
| | The bottle was capped and rolled overnight. |
| | The resin slurry was filtered by gravity on a cup. |
| | The resin was washed slowly with ~40 mL water. |
| | The filtrate and the wash were combined for analysis of $CN_T$ and Cu. |
| | The eluted resin was submitted for analysis of Cu and Zn by XRF. |
| Resin: | IX-6AR containing ~13% Cu (~53 g/L Cu), ~14% CN (57 g/L CN)   Volume:   10 mL |
| Eluant: | 32.51 g/L CN   Volume:   10 mL |
| | (0.65 g NaCN 95%) |
| Temperature: | 20–25° C.   Sol-to-Resin Ratio:   1-to-1 |
| Method: | Bottle on roller overnight |

| | | | Analysis (mg/L, %) | | | | | | | | | |
|---|---|---|---|---|---|---|---|---|---|---|---|---|
| | | | | | | | CN:Cu | | | Cal. Resin (%) | | |
| Sample | Volume mL | Mass g | * | Zn | Cu | M/M | S(T) | SCN | CN | Cu | SCN 51.6 g/L Cu | 49.5 g/L CN |
| Feed resin | 10 | 4.06 | 12.2 | 0.81 | 12.7 | 2.1 | 2.85 | | 12.2 | 12.7 | | |
| Eluant | 10 | | 32513 | — | — | — | — | — | — | — | | |
| Effluate & wash | 45 | | 7850 | NA | 5450 | 3.5 | NA | — | 11.5 | 6.19 | | |
| Eluted resin | 10 | | | | | | | | | | | |
| Calc. | 10 | 3.77 | 11.5 | | 6.19 | 4.0 | — | — | | | | |
| Assay | 10 | 3.77 | 10.5 | 0.77 | 8.07 | 2.8 | NA | — | | | | |

*Feed resin being reassayed for CN(T)
NA: not analyzed

| Eluted Resin | 2 mL | 79 mg CN(T) | |
|---|---|---|---|
| | 6 mL, wt: | 2.26 g | 0.377 g/mL |

| Project 04116-001 Test IX-19 | |
|---|---|
| Purpose: | Elution of copper from IX-6AR (~13% Cu, ~14% CN) resin using NaCN at 50% of the requirement for removing Cu and at a solution-to-resin ratio of 1-to-1, in a bottle. |
| Procedure: | The feed resin was placed in a small bottle. Water was drained/decanted. |
| | The eluant was prepared then added to the bottle. |
| | The bottle was capped and rolled overnight. |
| | The resin slurry was filtered by gravity on a cup. |
| | The resin was washed slowly with ~40 mL water. |
| | The filtrate and the wash were combined for analysis of $CN_T$ and Cu. |
| | The eluted resin was submitted for analysis of Cu and Zn by XRF. |
| Resin: | IX-6AR containing ~13% Cu (~53 g/L Cu), ~14% CN (57 g/L CN)   Volume:   10 mL |
| Eluant: | 10.84 g/L CN   Volume:   10 mL |
| | (0.22 g NaCN 95%) |
| Temperature: | 20–25° C.   Sol-to-Resin Ratio:   1-to-1 |
| Method: | Bottle on roller overnight |

| | | | Analysis (mg/L, %) | | | | | | | | | |
|---|---|---|---|---|---|---|---|---|---|---|---|---|
| | | | | | | | CN:Cu | | | Cal. Resin (%) | | |
| Sample | Volume mL | Mass g | * | Zn | Cu | M/M | S(T) | SCN | CN | Cu | SCN 51.6 g/L Cu | 49.5 g/L CN |
| Feed resin | 10 | 4.06 | 12.2 | 0.81 | 12.7 | 2.1 | 2.85 | | 12.2 | 12.7 | | |
| Eluant | 10 | | 10838 | — | — | — | — | — | — | — | | |
| Effluate & wash | 50 | | 2430 | NA | 1920 | 3.1 | NA | — | 11.9 | 10.3 | | |
| Eluted resin | 10 | | | | | | | | | | | |
| Calc. | 10 | 3.97 | 11.9 | | 10.3 | 2.5 | — | — | | | | |
| Assay | 10 | 3.97 | 9.52 | 0.73 | 11.5 | 1.8 | NA | — | | | | |

*Feed resin being reassayed for CN(T)
NA: not analyzed

| Eluted Resin | 1.8 mL | 68 mg CN(T) | |
|---|---|---|---|
| | 6 mL, wt: | 2.38 g | 0.397 g/mL |

In view of the above, it will be seen that the several objects of the invention are achieved and other advantageous results attained.

As various changes could be made in the above processes without departing from the scope of the invention, it is intended that all matter contained in the above description shall be interpreted as illustrative and not in a limiting sense.

What is claimed is:

1. A process for recovering cyanide from feed material containing cyanide and copper comprising the steps of:

(a) contacting said feed material with a strong base anion exchange resin whereby copper and cyanide from said feed material are adsorbed onto said resin;

(b) contacting the resulting resin with an eluant solution containing free cyanide ion to elute copper and cyanide from said resin, the amount of copper removed being approximately equivalent to the amount of copper adsorbed onto said resin in step (a);

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali; and (h) returning the conditioned resin from step (f) to step (a) above.

2. A process as set forth in claim 1 wherein the copper precipitated in step (d) is optionally discarded before or after cyanide treatment or recovery from the precipitates.

3. A process as set forth in claim 1 wherein the precipitate from step (d) is smelted for recovery of copper.

4. A process as set forth in claim 1 wherein the copper in step (d) is precipitated as copper cyanide, copper thiocyanate or copper sulfide.

5. A process as set forth in claims 3 and 4 wherein said copper cyanide or copper thiocyanate is converted to copper sulfide prior to smelting.

6. A process as set forth in claim 5 wherein cyanide is recovered from copper cyanide as the result of its conversion to copper sulfide.

7. A process as set forth in claim 1 wherein the copper in step (d) is precipitated as copper cyanide or copper thiocyanate which is then used as the feed to a copper electrowinning or electroplating process with optional recovery of cyanide.

8. A process as set forth in claim 1 wherein the loading of said resin in step (a) is carried out so that the resin exchange sites are substantially loaded with metal cyanide complexes or thiocyanate ion thereby increasing the loading of cyanide and copper on said resin.

9. A process as set forth in claim 4 wherein said resin is substantially completely loaded with metal cyanide complexes so that most of the thiocyanate ion in said feed material is transported through step (a) of claim 1 and remains in the treated feed material.

10. A process as set forth in claim 1 wherein calcium is excluded from said eluant in step (b) and said eluant contains sodium based compounds thereby preventing the formation of calcium sulfate (gypsum) when sulfuric acid is present in said elution steps (b) and (f).

11. A process as set forth in claim 1 wherein hydrochloric acid resulting from the reaction of calcium chloride with sulfuric acid is used in precipitation step (d).

12. A process as set forth in claim 1 wherein the HCN removal from said acidified solution in step (e) is incomplete and the residual HCN is alkalized for use in elution step (b).

13. A process as set forth in claim 1 wherein the conditioned resin from step (f) is first washed to recover residual HCN prior to being returned to step (a) for loading.

14. A process as set forth in claim 1 wherein compounds of zinc or copper which complex with cyanide are added to said feed material to reduce the free cyanide concentration or CN:CU ratio to facilitate loading of cyanide on said strong base anion exchange resin.

15. A process for recovering cyanide from feed material containing cyanide and copper comprising the steps of:

(a) contacting said feed material with a strong base anion exchange resin whereby copper and cyanide from said feed material are absorbed onto said resin;

(b) contacting the resulting resin with an eluant solution containing free cyanide ion to elute copper and cyanide from said resin, the amount of copper removed being approximately equivalent to the amount of copper adsorbed onto said resin in step (a);

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali;

(h) returning the conditioned resin from step (f) to step (a) above; and wherein a portion of the copper precipitated in step (d) is recycled to said feed material in order to reduce the CN:Cu molar ratio in said feed material or on said resin thereby aiding in the loading of free CN⁻ on the resin.

16. A process for recovering cyanide from feed material containing cyanide and copper comprising the steps of:

(a) contacting said feed material with a strong base anion exchange resin whereby copper and cyanide from said feed material are adsorbed onto said resin;

(b) contacting the resulting resin with an eluant solution containing free cyanide ion to elute copper and cyanide from said resin, the amount of copper removed being approximately equivalent to the amount of copper adsorbed onto said resin in step (a);

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali;

(h) returning the conditioned resin from step (f) to step (a) above; and wherein the copper precipitated in step (d) is diluted with gypsum and subjected to selective precipitation in which part of the gypsum is precipitated with little or no copper product present.

17. A process for recovering cyanide from feed material containing cyanide and copper comprising the steps of:

(a) contacting said feed material with a strong base anion exchange resin whereby copper and cyanide from said feed material are adsorbed onto said resin;

(b) contacting the resulting resin with an eluant solution containing free cyanide ion to elute copper and cyanide from said resin, the amount of copper removed being approximately equivalent to the amount of copper adsorbed onto said resin in step (a);

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali;

(h) returning the conditioned resin from step (f) to step (a) above; and wherein the copper precipitate from step (d) is diluted with gypsum and the gypsum/copper precipitate subjected to flotation to separate the copper compound from the gypsum.

18. A process for recovering cyanide from feed material containing cyanide and copper comprising the steps of;

(a) contacting said feed material with a strong base anion exchange resin whereby copper and cyanide from said feed material are adsorbed onto said resin;

(b) contacting the resulting resin with an eluant solution containing free cyanide ion to elute copper and cyanide from said resin, the amount of copper removed being approximately equivalent to the amount of copper adsorbed onto said resin in step (a);

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali;

(h) returning the conditioned resin from step (f) to step (a) above; and wherein said resin from step (a) is treated with a solution of ferric sulfate, ferric chloride or ferric nitrate for the removal of excess thiocyanate.

19. A process for recovering cyanide from feed material containing cyanide and copper comprising the steps of:

(a) contacting said feed material with a strong base anion exchange resin whereby copper and cyanide from said feed material are adsorbed onto said resin;

(b) contacting the resulting resin with an eluant solution containing free cyanide ion to elute copper and cyanide from said resin, the amount of copper removed being approximately equivalent to the amount of copper adsorbed onto said resin in step (a);

(c) separating the eluted resin from the eluting solution or eluate from step (b);

(d) acidifying the eluate from step (b) to precipitate copper;

(e) separating the acidified solution from the precipitate in step (d) and alkalizing directly or after concentration the separated solution containing HCN;

(f) contacting the eluted resin from step (b) with an acid to condition the resin and remove additional cyanide while leaving most of the copper in the resin phase;

(g) converting the HCN solution formed in step (f) to cyanide ion, directly or after concentration of the HCN solution, by the addition of alkali;

(h) returning the conditioned resin from step (f) to step (a) above; and wherein the copper concentration on said resin is intentionally increased by allowing copper in the resin phase leaving the second elution step (f) to increase above approximately 1.0 moles of copper per liter of said resin.

20. In a process for recovering cyanide and optionally copper utilizing a strong base anion exchange resin wherein cyanide soluble copper compounds are contained in the resin phase which is to be loaded with cyanide and copper, the improvement which comprises maintaining the copper content of said resin phase greater than about 0.7 moles of Cu per mole of active anion exchange resin sites.

21. In a process for recovering cyanide and optionally copper utilizing a strong base anion exchange resin wherein cyanide soluble copper compounds are contained in the resin phase which is to be loaded with cyanide and copper, the improvement which comprises limiting the flow of loaded resin to a subsequent elution step so that the loaded resin has a CN:Cu ratio of 2:1 or less and the eluates therefrom approach a CN:Cu ratio of approximately 2–3.

* * * * *